(12) United States Patent
Schubert

(10) Patent No.: US 11,193,898 B1
(45) Date of Patent: Dec. 7, 2021

(54) SYSTEMS AND METHODS FOR CONTROLLING IMAGE CONTRAST IN AN X-RAY SYSTEM

(71) Applicant: American Science and Engineering, Inc., Billerica, MA (US)

(72) Inventor: Jeffrey R. Schubert, Somerville, MA (US)

(73) Assignee: American Science and Engineering, Inc., Billerica, MA (US)

(*) Notice: Subject to any disclaimer, the term of this patent is extended or adjusted under 35 U.S.C. 154(b) by 0 days.

(21) Appl. No.: 16/888,997

(22) Filed: Jun. 1, 2020

(51) Int. Cl.
| | |
|---|---|
| *G01T 1/167* | (2006.01) |
| *G01N 23/041* | (2018.01) |
| *G06T 1/00* | (2006.01) |
| *G01V 5/00* | (2006.01) |

(52) U.S. Cl.
CPC ......... *G01N 23/041* (2018.02); *G01V 5/0016* (2013.01); *G06T 1/0007* (2013.01); *G01N 2223/401* (2013.01); *G06T 2207/10116* (2013.01)

(58) Field of Classification Search
CPC ............ G01N 23/041; G01N 2223/101; G06T 1/0007; G06T 2207/10116; G01V 5/0016
See application file for complete search history.

(56) References Cited

U.S. PATENT DOCUMENTS

| | | | |
|---|---|---|---|
| 1,648,687 A | 11/1927 | Hoxie | |
| 2,569,872 A | 10/1951 | Skehan | |
| 2,636,619 A | 4/1953 | Alexander | |
| 2,825,817 A | 3/1958 | North | |
| 3,113,214 A | 12/1963 | Furnas, Jr. | |
| 3,275,831 A | 9/1966 | Martin | |
| 3,374,355 A | 3/1968 | Parratt | |
| 3,417,243 A | 12/1968 | Hill | |
| 3,439,166 A | 4/1969 | Chope | |

(Continued)

FOREIGN PATENT DOCUMENTS

| | | |
|---|---|---|
| CN | 1161103 | 10/1997 |
| CN | 1441914 A | 9/2003 |

(Continued)

OTHER PUBLICATIONS

International Search Report for PCT/US2020/035508, dated Sep. 10, 2020.

(Continued)

*Primary Examiner* — David P Porta
*Assistant Examiner* — Mamadou Faye
(74) *Attorney, Agent, or Firm* — Novel IP

(57) ABSTRACT

An X-ray inspection system for scanning objects and providing corresponding contrast controlled scan images is provided. The system includes an X-ray source configured to generate an X-ray beam for irradiating the object where the X-ray source is coupled with at least a first beam filter having a first thickness and a second beam filter having a second thickness greater than the first thickness, a detector array, a processing unit, a user interface configured to receive a user input indicative of a desired level of contrast in an image, and a controller configured to adjust a position of at least one of the first or second beam filters based on the user input indicative of the desired level of contrast in the at least one image.

18 Claims, 23 Drawing Sheets

(56) References Cited

U.S. PATENT DOCUMENTS

| | | | |
|---|---|---|---|
| 3,837,502 A | 9/1974 | Hornagold |
| 3,904,923 A | 9/1975 | Schwartz |
| 4,045,672 A | 8/1977 | Watanabe |
| 4,079,259 A | 3/1978 | Blum |
| 4,164,138 A | 8/1979 | Burkhart |
| 4,190,773 A | 2/1980 | Braden |
| 4,234,794 A | 11/1980 | Voinea |
| 4,239,969 A | 12/1980 | Galetta |
| 4,242,583 A | 12/1980 | Annis |
| 4,266,135 A | 5/1981 | Kuwik |
| 4,274,005 A | 6/1981 | Yamamura |
| 4,304,999 A | 12/1981 | Richey |
| 4,432,914 A | 2/1984 | Schifftner |
| 4,433,427 A | 2/1984 | Barnea |
| 4,658,408 A | 4/1987 | Amor |
| 4,982,096 A | 1/1991 | Fujii |
| 5,014,293 A | 5/1991 | Boyd |
| 5,041,728 A | 8/1991 | Spacher |
| 5,065,418 A | 11/1991 | Bermbach |
| 5,091,924 A | 2/1992 | Bermbach |
| 5,164,976 A | 11/1992 | Scheid |
| 5,168,540 A | 12/1992 | Winn |
| 5,181,234 A | 1/1993 | Smith |
| 5,185,778 A | 2/1993 | Magram |
| 5,197,088 A | 3/1993 | Vincent |
| 5,202,932 A | 4/1993 | Bier |
| 5,249,056 A * | 9/1993 | Gunday ................... H04N 5/14 348/254 |
| 5,259,012 A | 11/1993 | Baker |
| 5,363,940 A | 11/1994 | Fahrion |
| 5,394,454 A | 2/1995 | Harding |
| 5,493,596 A | 2/1996 | Annis |
| 5,503,424 A | 4/1996 | Agopian |
| 5,600,303 A | 2/1997 | Husseiny |
| 5,606,167 A | 2/1997 | Miller |
| 5,692,028 A | 11/1997 | Geus |
| 5,692,029 A | 11/1997 | Husseiny |
| 5,764,683 A | 6/1998 | Swift |
| 5,842,578 A | 12/1998 | Cordeiro |
| 5,909,478 A | 6/1999 | Polichar |
| 5,910,973 A | 6/1999 | Grodzins |
| 5,940,468 A | 8/1999 | Huang |
| 5,968,425 A | 10/1999 | Bross |
| 5,974,111 A | 10/1999 | Krug |
| 6,056,671 A | 5/2000 | Marmer |
| 6,067,344 A | 5/2000 | Grodzins |
| 6,081,580 A | 6/2000 | Grodzins |
| 6,151,381 A | 11/2000 | Grodzins |
| 6,192,104 B1 | 2/2001 | Adams |
| 6,216,540 B1 | 4/2001 | Nelson |
| 6,220,099 B1 | 4/2001 | Marti |
| 6,249,567 B1 | 6/2001 | Rothschild |
| 6,282,260 B1 | 8/2001 | Grodzins |
| 6,292,533 B1 | 9/2001 | Swift |
| 6,301,327 B1 | 10/2001 | Martens |
| 6,320,933 B1 | 11/2001 | Grodzins |
| 6,347,132 B1 | 2/2002 | Annis |
| 6,370,265 B1 * | 4/2002 | Bell ........................ G06T 5/009 345/589 |
| 6,418,194 B1 | 7/2002 | McPherson |
| 6,424,695 B1 | 7/2002 | Grodzins |
| 6,442,233 B1 | 8/2002 | Grodzins |
| 6,453,007 B2 | 9/2002 | Adams |
| 6,459,761 B1 | 10/2002 | Grodzins |
| 6,459,764 B1 | 10/2002 | Chalmers |
| 6,542,574 B2 | 4/2003 | Grodzins |
| 6,542,580 B1 | 4/2003 | Carver |
| 6,546,072 B1 | 4/2003 | Chalmers |
| 6,552,346 B2 | 4/2003 | Verbinski |
| 6,614,872 B2 | 9/2003 | Bueno |
| 6,621,888 B2 | 9/2003 | Grodzins |
| 6,658,087 B2 | 12/2003 | Chalmers |
| 6,665,373 B1 | 12/2003 | Kotowski |
| 6,702,459 B2 | 3/2004 | Barnes |
| 6,713,773 B1 | 3/2004 | Lyons |
| 6,843,599 B2 | 1/2005 | Le |
| 6,870,975 B1 | 3/2005 | Morison |
| 6,920,197 B2 | 7/2005 | Kang |
| 6,924,487 B2 | 8/2005 | Bolozdynya |
| 6,928,141 B2 | 8/2005 | Carver |
| 6,965,662 B2 | 11/2005 | Eppler |
| 7,010,094 B2 | 3/2006 | Grodzins |
| 7,046,768 B1 | 5/2006 | Gilevich |
| 7,072,440 B2 | 7/2006 | Mario |
| 7,099,434 B2 | 8/2006 | Adams |
| 7,110,493 B1 | 9/2006 | Kotowski |
| RE39,396 E | 11/2006 | Swift |
| 7,151,447 B1 | 12/2006 | Willms |
| 7,203,276 B2 | 4/2007 | Arsenault |
| 7,207,713 B2 | 4/2007 | Lowman |
| 7,215,738 B2 | 5/2007 | Muenchau |
| 7,218,704 B1 | 5/2007 | Adams |
| 7,322,745 B2 | 1/2008 | Agrawal |
| 7,366,282 B2 | 4/2008 | Peschmann |
| 7,369,643 B2 | 5/2008 | Kotowski |
| 7,379,530 B2 | 5/2008 | Hoff |
| 7,397,891 B2 | 7/2008 | Johnson |
| 7,400,701 B1 | 7/2008 | Cason |
| 7,409,042 B2 | 8/2008 | Bertozzi |
| 7,417,440 B2 | 8/2008 | Peschmann |
| 7,418,077 B2 | 8/2008 | Gray |
| 7,453,987 B1 | 11/2008 | Richardson |
| 7,471,764 B2 | 12/2008 | Kaval |
| 7,483,510 B2 | 1/2009 | Carver |
| 7,486,768 B2 | 2/2009 | Allman |
| 7,505,556 B2 | 3/2009 | Chalmers |
| 7,505,562 B2 | 3/2009 | Dinca |
| 7,517,149 B2 | 4/2009 | Agrawal |
| 7,519,148 B2 | 4/2009 | Kotowski |
| 7,525,101 B2 | 4/2009 | Grodzins |
| 7,526,064 B2 | 4/2009 | Akery |
| 7,538,325 B2 | 5/2009 | Mishin |
| 7,551,715 B2 | 6/2009 | Rothschild |
| 7,551,718 B2 | 6/2009 | Rothschild |
| 7,555,099 B2 | 6/2009 | Rothschild |
| 7,561,666 B2 | 7/2009 | Annis |
| 7,579,845 B2 | 8/2009 | Peschmann |
| 7,593,506 B2 | 9/2009 | Cason |
| 7,593,510 B2 | 9/2009 | Rothschild |
| 7,660,388 B2 | 2/2010 | Gray |
| 7,684,538 B2 | 3/2010 | Morton |
| 7,720,195 B2 | 5/2010 | Allman |
| 7,724,868 B2 | 5/2010 | Morton |
| 7,742,568 B2 | 6/2010 | Smith |
| 7,769,133 B2 | 8/2010 | Carver |
| 7,783,004 B2 | 8/2010 | Kotowski |
| 7,783,005 B2 | 8/2010 | Kaval |
| 7,817,776 B2 | 10/2010 | Agrawal |
| 7,856,081 B2 | 12/2010 | Peschmann |
| 7,860,213 B2 | 12/2010 | Akery |
| 7,864,920 B2 | 1/2011 | Rothschild |
| 7,876,879 B2 | 1/2011 | Morton |
| 7,876,880 B2 | 1/2011 | Kotowski |
| 7,903,789 B2 | 3/2011 | Morton |
| 7,915,596 B2 | 3/2011 | Clothier |
| 7,924,979 B2 | 4/2011 | Rothschild |
| 7,928,400 B1 | 4/2011 | Awara |
| 7,929,663 B2 | 4/2011 | Morton |
| 7,949,101 B2 | 5/2011 | Morton |
| 7,963,695 B2 | 6/2011 | Kotowski |
| 7,982,191 B2 | 7/2011 | Friedman |
| 7,991,113 B2 | 8/2011 | Carver |
| 7,991,133 B2 | 8/2011 | Mills |
| 7,995,705 B2 | 8/2011 | Allman |
| 7,995,707 B2 | 8/2011 | Rothschild |
| 8,054,937 B2 | 11/2011 | Langeveld |
| 8,054,938 B2 | 11/2011 | Kaval |
| 8,059,781 B2 | 11/2011 | Agrawal |
| 8,073,099 B2 | 12/2011 | Niu |
| 8,085,897 B2 | 12/2011 | Morton |
| 8,094,784 B2 | 1/2012 | Morton |
| 8,135,110 B2 | 3/2012 | Morton |
| 8,138,770 B2 | 3/2012 | Peschmann |
| 8,170,177 B2 | 5/2012 | Akery |

(56) References Cited

U.S. PATENT DOCUMENTS

| | | |
|---|---|---|
| 8,194,822 B2 | 6/2012 | Rothschild |
| 8,204,173 B2 | 6/2012 | Betcke |
| 8,223,919 B2 | 7/2012 | Morton |
| 8,243,876 B2 | 8/2012 | Morton |
| 8,275,091 B2 | 9/2012 | Morton |
| 8,275,092 B1 | 9/2012 | Zhang |
| 8,325,871 B2 | 12/2012 | Grodzins |
| 8,331,535 B2 | 12/2012 | Morton |
| 8,345,819 B2 | 1/2013 | Mastronardi |
| 8,356,937 B2 | 1/2013 | Kotowski |
| 8,385,501 B2 | 2/2013 | Allman |
| 8,389,942 B2 | 3/2013 | Morton |
| 8,428,217 B2 | 4/2013 | Peschmann |
| 8,433,036 B2 | 4/2013 | Morton |
| 8,437,448 B2 | 5/2013 | Langeveld |
| 8,439,565 B2 | 5/2013 | Mastronardi |
| 8,442,186 B2 | 5/2013 | Rothschild |
| 8,451,974 B2 | 5/2013 | Morton |
| 8,457,274 B2 | 6/2013 | Arodzero |
| 8,457,275 B2 | 6/2013 | Akery |
| 8,483,356 B2 | 7/2013 | Bendahan |
| 8,491,189 B2 | 7/2013 | Kotowski |
| 8,503,605 B2 | 8/2013 | Morton |
| 8,503,606 B2 | 8/2013 | Rothschild |
| 8,532,823 B2 | 9/2013 | Mcelroy |
| 8,552,722 B2 | 10/2013 | Lionheart |
| 8,559,592 B2 | 10/2013 | Betcke |
| 8,579,506 B2 | 11/2013 | Morton |
| 8,582,720 B2 | 11/2013 | Morton |
| 8,625,735 B2 | 1/2014 | Morton |
| 8,644,453 B2 | 2/2014 | Morton |
| 8,668,386 B2 | 3/2014 | Morton |
| 8,674,706 B2 | 3/2014 | Peschmann |
| 8,687,765 B2 | 4/2014 | Kotowski |
| 8,690,427 B2 | 4/2014 | Mastronardi |
| 8,731,137 B2 | 5/2014 | Arroyo |
| 8,735,833 B2 | 5/2014 | Morto |
| 8,750,452 B2 | 6/2014 | Kaval |
| 8,750,454 B2 | 6/2014 | Gozani |
| 8,774,357 B2 | 7/2014 | Morton |
| 8,781,067 B2 | 7/2014 | Langeveld |
| 8,798,232 B2 | 8/2014 | Bendahan |
| 8,804,899 B2 | 8/2014 | Morton |
| 8,824,632 B2 | 9/2014 | Mastronardi |
| 8,824,637 B2 | 9/2014 | Morton |
| 8,831,176 B2 | 9/2014 | Morto |
| 8,837,669 B2 | 9/2014 | Morton |
| 8,837,670 B2 | 9/2014 | Akery |
| 8,840,303 B2 | 9/2014 | Morton |
| 8,842,808 B2 | 9/2014 | Rothschild |
| 8,861,684 B2 | 10/2014 | Al-Kofahi |
| 8,885,794 B2 | 11/2014 | Morton |
| 8,903,045 B2 | 12/2014 | Schubert |
| 8,903,046 B2 | 12/2014 | Morton |
| 8,908,831 B2 | 12/2014 | Bendahan |
| 8,929,509 B2 | 1/2015 | Morton |
| 8,958,526 B2 | 2/2015 | Morton |
| 8,971,485 B2 | 3/2015 | Morton |
| 8,971,487 B2 | 3/2015 | Mastronardi |
| 8,993,970 B2 | 3/2015 | Morton |
| 9,001,973 B2 | 4/2015 | Morton |
| 9,014,339 B2 | 4/2015 | Grodzins |
| 9,020,095 B2 | 4/2015 | Morton |
| 9,020,096 B2 | 4/2015 | Allman |
| 9,020,103 B2 | 4/2015 | Grodzins |
| 9,025,731 B2 | 5/2015 | Kotowski |
| 9,036,779 B2 | 5/2015 | Morton |
| 9,042,511 B2 | 5/2015 | Peschmann |
| 9,046,465 B2 | 6/2015 | Thompson |
| 9,048,061 B2 | 6/2015 | Morton |
| 9,052,264 B2 | 6/2015 | Bendahan |
| 9,052,271 B2 | 6/2015 | Grodzins |
| 9,052,403 B2 | 6/2015 | Morton |
| 9,057,679 B2 | 6/2015 | Morton |
| 9,069,101 B2 | 6/2015 | Arroyo, Jr. |
| 9,086,497 B2 | 7/2015 | Bendahan |
| 9,093,245 B2 | 7/2015 | Morton |
| 9,099,279 B2 | 8/2015 | Rommel |
| 9,111,331 B2 | 8/2015 | Parikh |
| 9,113,839 B2 | 8/2015 | Morton |
| 9,117,564 B2 | 8/2015 | Rommel |
| 9,121,958 B2 | 9/2015 | Morton |
| 9,128,198 B2 | 9/2015 | Morton |
| 9,146,201 B2 | 9/2015 | Schubert |
| 9,158,027 B2 | 10/2015 | Morton |
| 9,158,030 B2 | 10/2015 | Morton |
| 9,183,647 B2 | 11/2015 | Morton |
| 9,207,195 B2 | 12/2015 | Gozani |
| 9,208,988 B2 | 12/2015 | Morton |
| 9,218,933 B2 | 12/2015 | Langeveld |
| 9,219,176 B2 | 12/2015 | Horiuchi |
| 9,223,049 B2 | 12/2015 | Kotowski |
| 9,223,050 B2 | 12/2015 | Kaval |
| 9,223,052 B2 | 12/2015 | Morton |
| 9,257,208 B2 | 2/2016 | Rommel |
| 9,263,225 B2 | 2/2016 | Morton |
| 9,268,058 B2 | 2/2016 | Peschmann |
| 9,274,065 B2 | 3/2016 | Morton |
| 9,279,901 B2 | 3/2016 | Akery |
| 9,285,488 B2 | 3/2016 | Arodzero |
| 9,285,498 B2 | 3/2016 | Carver |
| 9,291,582 B2 | 3/2016 | Grodzins |
| 9,310,322 B2 | 4/2016 | Panesar |
| 9,310,323 B2 | 4/2016 | Bendahan |
| 9,316,760 B2 | 4/2016 | Bendahan |
| 9,329,285 B2 | 5/2016 | Gozani |
| 9,332,624 B2 | 5/2016 | Morton |
| 9,417,060 B1 | 8/2016 | Schubert |
| 9,420,677 B2 | 8/2016 | Morton |
| 9,429,530 B2 | 8/2016 | Morton |
| 9,442,082 B2 | 9/2016 | Morton |
| 9,465,135 B2 | 10/2016 | Morton |
| 9,466,456 B2 | 10/2016 | Rommel |
| 9,535,019 B1 | 1/2017 | Rothschild |
| 9,541,510 B2 | 1/2017 | Arodzero |
| 9,562,866 B2 | 2/2017 | Morton |
| 9,576,766 B2 | 2/2017 | Morton |
| 9,606,259 B2 | 3/2017 | Morton |
| 9,618,648 B2 | 4/2017 | Morton |
| 9,632,205 B2 | 4/2017 | Morton |
| 9,638,646 B2 | 5/2017 | Morton |
| 9,658,343 B2 | 5/2017 | Arodzero |
| 9,675,306 B2 | 6/2017 | Morton |
| 9,688,517 B2 | 6/2017 | Morton |
| 9,714,920 B2 | 7/2017 | Lionheart |
| 9,726,619 B2 | 8/2017 | Thompson |
| 9,747,705 B2 | 8/2017 | Morton |
| 9,791,590 B2 | 10/2017 | Morton |
| 9,817,151 B2 | 11/2017 | Morton |
| 9,823,201 B2 | 11/2017 | Morton |
| 9,835,756 B2 | 12/2017 | Morton |
| 9,841,386 B2 | 12/2017 | Grodzins |
| 9,958,569 B2 | 5/2018 | Morton |
| 10,007,019 B2 | 6/2018 | Morton |
| 10,007,021 B2 | 6/2018 | Morton |
| 10,098,214 B2 | 10/2018 | Morton |
| 10,107,783 B2 | 10/2018 | Lionheart |
| 10,175,381 B2 | 1/2019 | Morton |
| 10,228,487 B2 | 3/2019 | Mastronardi |
| 10,295,483 B2 | 5/2019 | Morton |
| 10,302,807 B2 | 5/2019 | Yu |
| 10,317,566 B2 | 6/2019 | Morton |
| 10,408,967 B2 | 9/2019 | Morton |
| 10,422,919 B2 | 9/2019 | Parikh |
| 10,483,077 B2 | 11/2019 | Morton |
| 10,585,207 B2 | 3/2020 | Morton |
| 10,591,424 B2 | 3/2020 | Morton |
| 10,591,629 B2 | 3/2020 | Toppan |
| 10,663,616 B2 | 5/2020 | Morton |
| 10,900,911 B2 * | 1/2021 | Brabant ............... G01V 5/0016 |
| 10,901,112 B2 | 1/2021 | Morton |
| 10,976,271 B2 | 4/2021 | Morton |
| 2002/0094064 A1 | 7/2002 | Zhou |
| 2003/0016790 A1 | 1/2003 | Grodzins |

(56) References Cited

U.S. PATENT DOCUMENTS

| | | |
|---|---|---|
| 2003/0043964 A1 | 3/2003 | Sorenson |
| 2003/0068557 A1 | 4/2003 | Kumashiro |
| 2003/0095626 A1 | 5/2003 | Anderton |
| 2003/0142783 A1 | 7/2003 | Daaland |
| 2003/0161434 A1 | 8/2003 | Rand |
| 2003/0235271 A1 | 12/2003 | Rand |
| 2004/0051265 A1 | 3/2004 | Nadeau |
| 2004/0104347 A1 | 6/2004 | Bross |
| 2004/0120454 A1 | 6/2004 | Ellenbogen |
| 2004/0120457 A1 | 6/2004 | Karellas |
| 2004/0141584 A1 | 7/2004 | Bernardi |
| 2004/0252024 A1 | 12/2004 | Huey |
| 2004/0258198 A1 | 12/2004 | Carver |
| 2005/0023479 A1 | 2/2005 | Grodzins |
| 2005/0024199 A1 | 2/2005 | Huey |
| 2005/0100135 A1 | 5/2005 | Lowman |
| 2005/0113684 A1 | 5/2005 | Lokhandwalla |
| 2005/0117683 A1 | 6/2005 | Mishin |
| 2005/0135668 A1 | 6/2005 | Polichar |
| 2005/0157842 A1 | 7/2005 | Agrawal |
| 2005/0169421 A1 | 8/2005 | Muenchau |
| 2005/0185757 A1 | 8/2005 | Kresse |
| 2005/0198226 A1 | 9/2005 | Delia |
| 2005/0236577 A1 | 10/2005 | Katagiri |
| 2005/0286681 A1* | 12/2005 | Bernhardt .............. G01N 23/04 378/62 |
| 2006/0027751 A1 | 2/2006 | Kurita |
| 2006/0056584 A1 | 3/2006 | Allman |
| 2006/0078091 A1 | 4/2006 | Lasiuk |
| 2006/0114477 A1 | 6/2006 | Cox |
| 2006/0126792 A1 | 6/2006 | Li |
| 2006/0140341 A1 | 6/2006 | Carver |
| 2006/0182221 A1 | 8/2006 | Bernhardt |
| 2006/0233298 A1 | 10/2006 | Igarashi |
| 2006/0245547 A1 | 11/2006 | Callerame |
| 2006/0245548 A1 | 11/2006 | Callerame |
| 2006/0249685 A1 | 11/2006 | Tanaka |
| 2006/0257005 A1 | 11/2006 | Bergeron |
| 2006/0280293 A1 | 12/2006 | Hardesty |
| 2006/0284094 A1 | 12/2006 | Inbar |
| 2007/0029493 A1 | 2/2007 | Kniss |
| 2007/0069146 A1 | 3/2007 | Neal |
| 2007/0085010 A1 | 4/2007 | Letant |
| 2007/0098142 A1 | 5/2007 | Rothschild |
| 2007/0140423 A1 | 6/2007 | Poland |
| 2007/0172031 A1 | 7/2007 | Cason |
| 2007/0172129 A1 | 7/2007 | Tortora |
| 2007/0189454 A1 | 8/2007 | Georgeson |
| 2007/0210255 A1 | 9/2007 | Bjorkholm |
| 2007/0217572 A1 | 9/2007 | Kotowski |
| 2007/0228284 A1 | 10/2007 | Polichar |
| 2007/0237293 A1 | 10/2007 | Singh |
| 2007/0237294 A1 | 10/2007 | Hoff |
| 2007/0280502 A1 | 12/2007 | Paresi |
| 2008/0037707 A1 | 2/2008 | Rothschild |
| 2008/0048872 A1 | 2/2008 | Frank |
| 2008/0084963 A1 | 4/2008 | Clayton |
| 2008/0089478 A1 | 4/2008 | Hartick |
| 2008/0128624 A1 | 6/2008 | Cooke |
| 2008/0159591 A1 | 7/2008 | Ruedin |
| 2008/0170670 A1 | 7/2008 | Bhatt |
| 2008/0198970 A1 | 8/2008 | Kirshner |
| 2008/0205594 A1 | 8/2008 | Bjorkholm |
| 2008/0230709 A1 | 9/2008 | Tkaczyk |
| 2008/0260097 A1 | 10/2008 | Anwar |
| 2008/0304622 A1 | 12/2008 | Morton |
| 2009/0001296 A1 | 1/2009 | Kuduvalli |
| 2009/0050812 A1 | 2/2009 | Dunleavy |
| 2009/0067575 A1 | 3/2009 | Seppi |
| 2009/0086907 A1 | 4/2009 | Smith |
| 2009/0103686 A1 | 4/2009 | Rothschild |
| 2009/0116617 A1 | 5/2009 | Mastronardi |
| 2009/0127459 A1 | 5/2009 | Neustadter |
| 2009/0161827 A1 | 6/2009 | Gertner |
| 2009/0168964 A1 | 7/2009 | Safai |
| 2009/0186895 A1 | 7/2009 | Teegarden |
| 2009/0213984 A1 | 8/2009 | Warner |
| 2009/0238336 A1 | 9/2009 | Akery |
| 2009/0245462 A1 | 10/2009 | Agrawal |
| 2009/0257555 A1 | 10/2009 | Chalmers |
| 2009/0268871 A1 | 10/2009 | Rothschild |
| 2009/0274270 A1 | 11/2009 | Kotowski |
| 2009/0279664 A1* | 11/2009 | McNabb, Jr. ......... G01V 5/0016 378/62 |
| 2009/0285353 A1 | 11/2009 | Ellenbogen |
| 2009/0316851 A1 | 12/2009 | Oosaka |
| 2010/0020937 A1 | 1/2010 | Hautmann |
| 2010/0072398 A1 | 3/2010 | Fruehauf |
| 2010/0161504 A1 | 6/2010 | Casey |
| 2010/0171052 A1 | 7/2010 | Thoms |
| 2010/0177868 A1 | 7/2010 | Smith |
| 2010/0177873 A1 | 7/2010 | Chen |
| 2010/0276602 A1 | 11/2010 | Clothier |
| 2010/0295689 A1 | 11/2010 | Armistead |
| 2011/0019797 A1 | 1/2011 | Morton |
| 2011/0019799 A1 | 1/2011 | Shedlock |
| 2011/0038453 A1 | 2/2011 | Morton |
| 2011/0064192 A1 | 3/2011 | Morton |
| 2011/0075808 A1 | 3/2011 | Rothschild |
| 2011/0079726 A1 | 4/2011 | Kusner |
| 2011/0096973 A1 | 4/2011 | Ding |
| 2011/0103548 A1 | 5/2011 | Bendahan |
| 2011/0204243 A1 | 8/2011 | Bendahan |
| 2011/0235777 A1 | 9/2011 | Gozani |
| 2011/0266643 A1 | 11/2011 | Engelmann |
| 2011/0309257 A1 | 12/2011 | Menge |
| 2012/0033791 A1 | 2/2012 | Mastronardi |
| 2012/0069964 A1* | 3/2012 | Scrolling ......... G01N 23/20083 378/97 |
| 2012/0099710 A1 | 4/2012 | Kotowski |
| 2012/0104276 A1 | 5/2012 | Miller |
| 2012/0106714 A1 | 5/2012 | Grodzins |
| 2012/0116720 A1 | 5/2012 | Klann |
| 2012/0201356 A1* | 8/2012 | Rothschild ........... G01V 5/0025 378/87 |
| 2012/0236990 A1 | 9/2012 | Rothschild |
| 2012/0257710 A1 | 10/2012 | Funk |
| 2013/0001048 A1 | 1/2013 | Panesar |
| 2013/0044859 A1* | 2/2013 | Yabugami .............. A61B 6/467 378/62 |
| 2013/0156151 A1 | 6/2013 | Sugaya |
| 2014/0105367 A1 | 4/2014 | Horvarth |
| 2014/0185771 A1 | 7/2014 | Morton |
| 2014/0197321 A1 | 7/2014 | Bendahan |
| 2015/0036798 A1 | 2/2015 | Morton |
| 2015/0078519 A1 | 3/2015 | Morton |
| 2015/0168589 A1 | 6/2015 | Morton |
| 2015/0301220 A1 | 10/2015 | Morton |
| 2015/0355117 A1 | 12/2015 | Morton |
| 2015/0355369 A1 | 12/2015 | Morton |
| 2016/0025888 A1 | 1/2016 | Peschmann |
| 2016/0025889 A1 | 1/2016 | Morton |
| 2016/0033674 A1 | 2/2016 | Allman |
| 2016/0170077 A1 | 6/2016 | Morton |
| 2016/0223706 A1 | 8/2016 | Franco |
| 2017/0059739 A1 | 3/2017 | Mastronardi |
| 2017/0071559 A1 | 3/2017 | Kappler |
| 2017/0299526 A1 | 10/2017 | Morton |
| 2017/0299764 A1 | 10/2017 | Morton |
| 2017/0315242 A1 | 11/2017 | Arodzero |
| 2018/0128935 A1 | 5/2018 | Morton |
| 2018/0252841 A1 | 9/2018 | Grodzins |
| 2018/0286624 A1 | 10/2018 | Rommel |
| 2018/0313770 A1 | 11/2018 | Morton |
| 2018/0328861 A1 | 11/2018 | Grodzins |
| 2018/0333109 A1 | 11/2018 | Zamenhof |
| 2020/0033274 A1 | 1/2020 | Couture |

FOREIGN PATENT DOCUMENTS

| | | |
|---|---|---|
| CN | 1620616 | 5/2005 |
| CN | 1995993 | 7/2007 |
| CN | 201060275 | 5/2008 |

(56) References Cited

FOREIGN PATENT DOCUMENTS

| | | | |
|---|---|---|---|
| CN | 101971054 A | 2/2011 | |
| DE | 1090784 | 10/1960 | |
| DE | 102005029674 | 12/2006 | |
| EP | 0077018 A1 | 4/1983 | |
| EP | 0919186 A2 | 6/1999 | |
| EP | 1413898 A1 | 4/2004 | |
| EP | 1558947 B1 | 8/2005 | |
| EP | 2223165 B1 | 9/2010 | |
| GB | 2255634 A | 11/1992 | |
| GB | 2295266 | 5/1996 | |
| GB | 2409268 A | 6/2005 | |
| GB | 2424065 A | 9/2006 | |
| GB | 2438317 A | 11/2007 | |
| JP | S5234689 | 3/1977 | |
| JP | S60159675 | 8/1985 | |
| JP | H02275400 | 11/1990 | |
| JP | H03257391 | 11/1991 | |
| JP | H06027249 | 2/1994 | |
| JP | H06237927 | 8/1994 | |
| JP | H07072257 | 3/1995 | |
| JP | H10232284 | 9/1998 | |
| JP | H10288671 | 10/1998 | |
| JP | H11160444 | 6/1999 | |
| JP | H11271453 | 10/1999 | |
| JP | 2000506613 | 5/2000 | |
| JP | 2000235078 | 8/2000 | |
| JP | 2000304865 | 11/2000 | |
| JP | 2000346947 | 12/2000 | |
| JP | 2001058881 | 3/2001 | |
| JP | 2001228255 | 8/2001 | |
| JP | 2002221578 | 8/2002 | |
| JP | 2004033757 | 2/2004 | |
| JP | 2006510033 | 3/2006 | |
| JP | 2008304947 | 12/2008 | |
| JP | 2010164592 | 7/2010 | |
| JP | 2010181412 | 8/2010 | |
| JP | 2011158291 | 8/2011 | |
| JP | 2011224341 | 11/2011 | |
| JP | 2011227044 | 11/2011 | |
| KR | 20050071663 A | 7/2005 | |
| KR | 20070092440 | 9/2007 | |
| KR | 20100101084 A | 9/2010 | |
| RU | 2008113784 | 10/2009 | |
| WO | 9855851 A1 | 12/1998 | |
| WO | 2000033060 | 6/2000 | |
| WO | 2000037928 | 6/2000 | |
| WO | 2002027308 | 4/2002 | |
| WO | 2004010127 | 1/2004 | |
| WO | 2004010127 A1 | 1/2004 | |
| WO | 2004043740 A2 | 5/2004 | |
| WO | 2005098400 A2 | 10/2005 | |
| WO | 2006036076 A1 | 4/2006 | |
| WO | 2006047718 | 5/2006 | |
| WO | 2006053279 A2 | 5/2006 | |
| WO | 2006078691 A2 | 7/2006 | |
| WO | 2007035359 A2 | 3/2007 | |
| WO | 2007055720 A2 | 5/2007 | |
| WO | 2007068933 A1 | 6/2007 | |
| WO | 2007103216 A2 | 9/2007 | |
| WO | 2007111672 A2 | 11/2007 | |
| WO | 2008017983 A2 | 2/2008 | |
| WO | 2008081179 | 7/2008 | |
| WO | 2009106803 A2 | 9/2009 | |
| WO | 2009143169 A1 | 11/2009 | |
| WO | 2011069024 A1 | 6/2011 | |
| WO | 2011091070 A2 | 7/2011 | |
| WO | 2011095810 | 8/2011 | |
| WO | 2011115923 | 9/2011 | |
| WO | 2011163108 | 12/2011 | |
| WO | 2012106730 | 8/2012 | |
| WO | 2013116549 | 8/2013 | |
| WO | 2013119423 A1 | 8/2013 | |
| WO | 2014107675 | 7/2014 | |
| WO | 2014121097 A1 | 8/2014 | |
| WO | 2014124152 A2 | 8/2014 | |
| WO | 2016011205 | 1/2016 | |
| WO | 2018064434 | 4/2018 | |

OTHER PUBLICATIONS

Written Opinion of the International Searching Authority for PCT/US2020/035508, dated Sep. 10, 2020.
Scitec Instruments "Optical Chopper Specials", www.scitec.uk.com 6 pages.
International Search Report and Written Opinion for PCT/US2011/057648, dated May 10, 2012.
International Search Report for PCT/US17/54211, dated Jan. 18, 2018.
CRS Report for Congress, Aviation Security Technologies and Procedures: Screening Passengers and Baggage, Oct. 26, 2001, pp. 1-12.
International Search Report for PCT/US2015/040653, dated Dec. 16, 2015.
International Search Report for PCT/US14/56652, dated Apr. 27, 2015.
International Search Report for PCT/US14/14198, dated May 16, 2014.
International Preliminary Report on Patentability for PCT/US2014/014198, dated Aug. 4, 2015.
International Search Report for PCT/US11/21758; dated Jul. 7, 2011, Rapiscan Systems Inc.
International Preliminary Report on Patentability for PCT/US11/21758, dated Jul. 7, 2011.
Written Opinion on Patentability for PCT/US11/21758; dated Jul. 7, 2011; Rapiscan Systems.
Molchanov P A et al.: 'Nanosecond gated optical sensors for ocean optic applications' Sensors Applications Symposium, 2006. Proceedings of the 2006 IEEE Houston, Texas,USA Feb. 7-9, 2006, Piscataway, NJ, USA,IEEE, Feb. 7, 2006 (Feb. 7, 2006), pp. 147-150, XP010917671 ISBN: 978-0-7803-9580-0.
Mobile X-Ray Inspection Systems, Internet Citation, Feb. 12, 2007, pp. 1-2, URL:http://web.archive.org/web/20070212000928/http://www.bombdetecti- on.com/cat-details.php?catid=20.
International Search Report for PCT/GB09/00575, dated Apr. 7, 2010.
International Search Report for PCT/GB2009/000497, dated Jan. 22, 2010.
Smith C. R. et al.: 'Application of 450 kV computed tomography to engine blocks with steel liners' Materials Evaluation vol. 65, No. 5, 2007, pp. 458-461, XP055108238.
International Search Report for PCT/US13/23676, dated Jun. 28, 2013.
International Search Report for PCT/US13/24191, Rapiscan Systems Inc., dated Jun. 25, 2013.
International Search Report for PCT/US2014/010370, dated May 13, 2014.
International Search Report for PCT/US10/58809; Rapiscan Systems Inc.; dated Apr. 19, 2011.
International Search Report for PCT/US2014/015126, dated May 27, 2014.
Written Opinion of the International Searching Authority for PCT/US2014/015126, dated May 27, 2014.
International Search Report for PCT/US2012/054110, dated Dec. 24, 2012.
Wamiq M Ahmed et al.: "Historical comparison of vehicels using scanned x-ray images", 2011 IEEE Workshop on Applications of Computer Vision (WACV), Jan. 5, 2011, pp. 288-293.
Anonymous: "Rhombus—Wikipedia", Jul. 2, 2012 (Jul. 2, 2012), XP055675098, Retrieved from the Internet: URL:https://en.wikipedia.org/w/index.php?title=Rhombus&oldid=500342428 [retrieved on Mar. 10, 2020].

\* cited by examiner

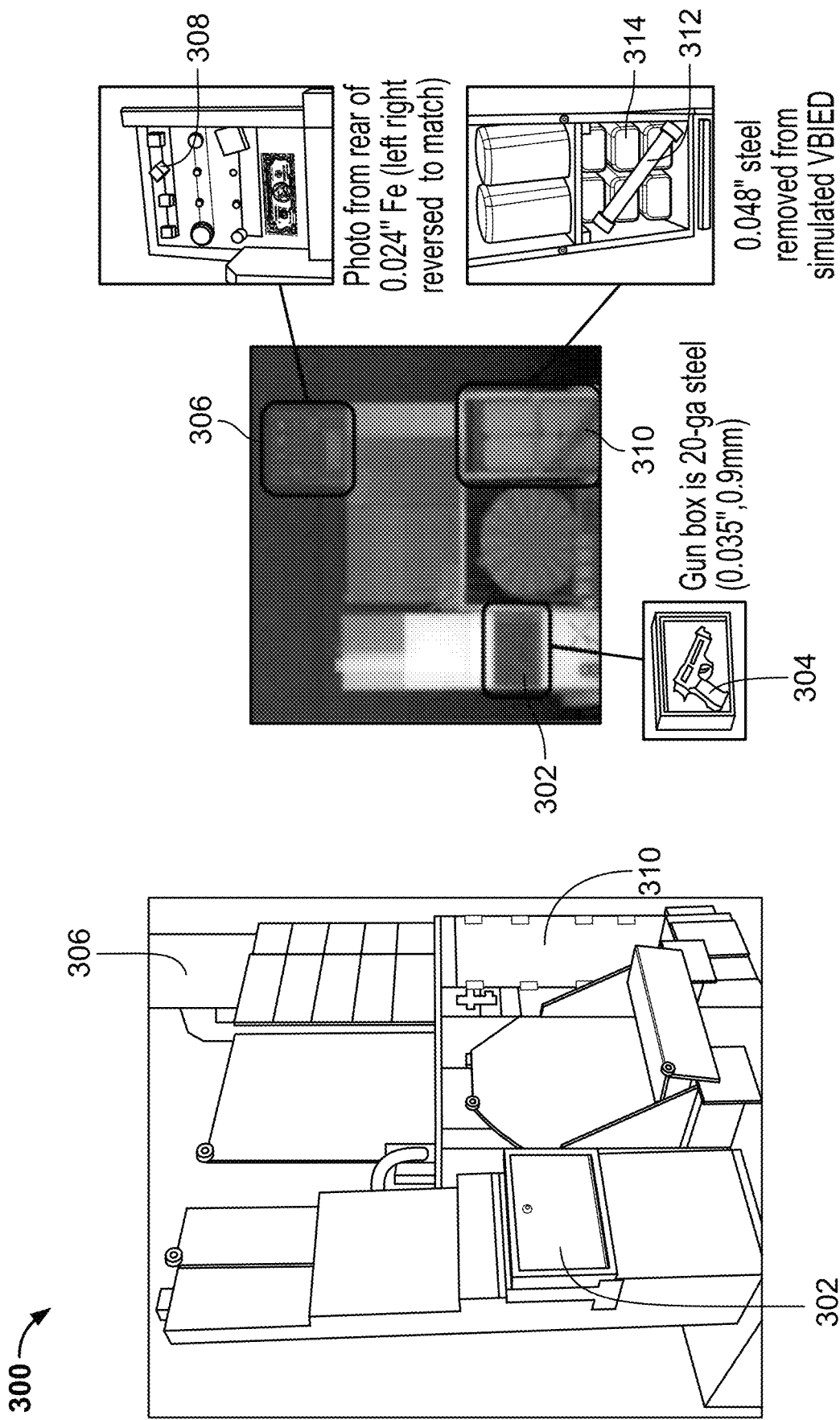

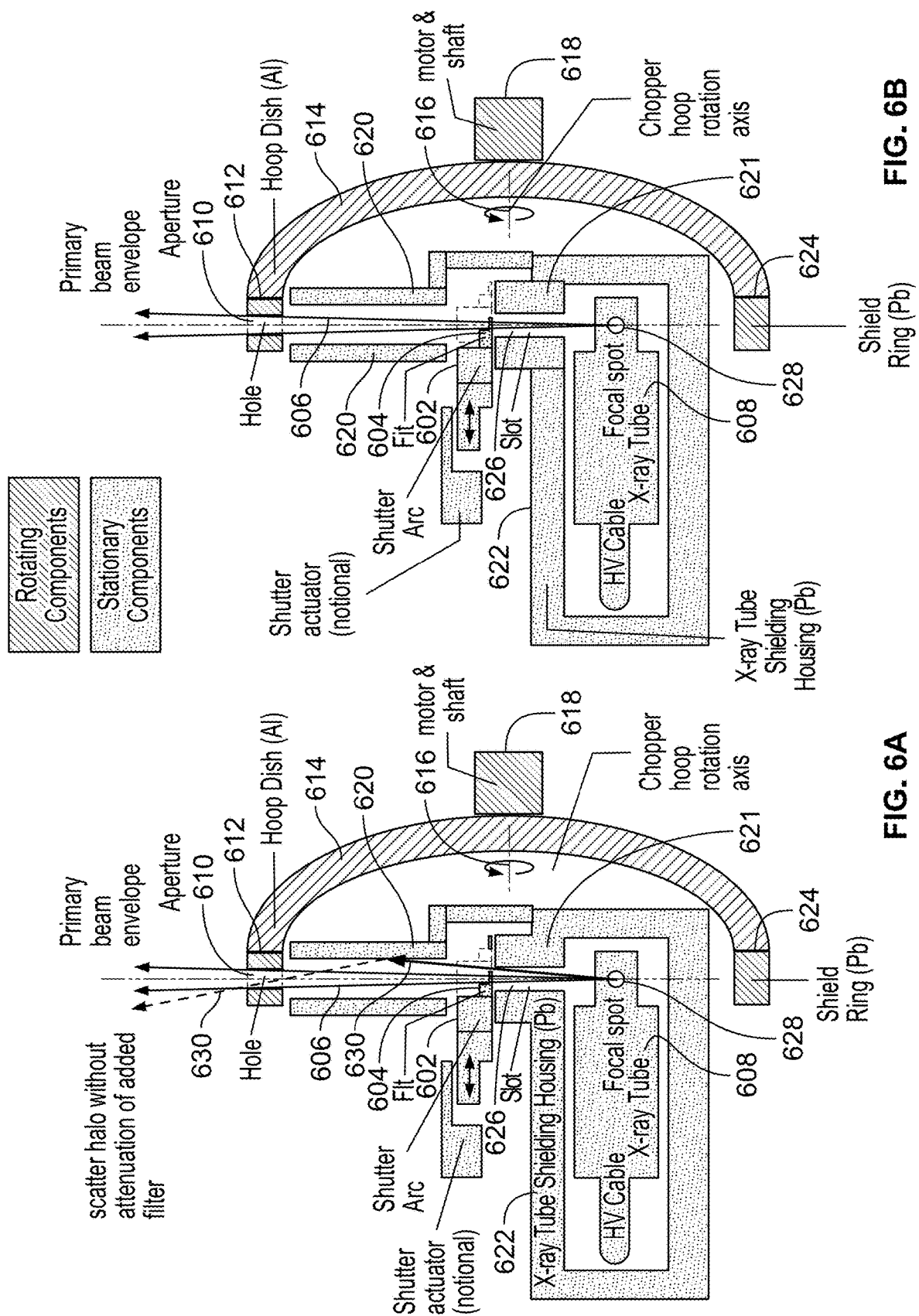

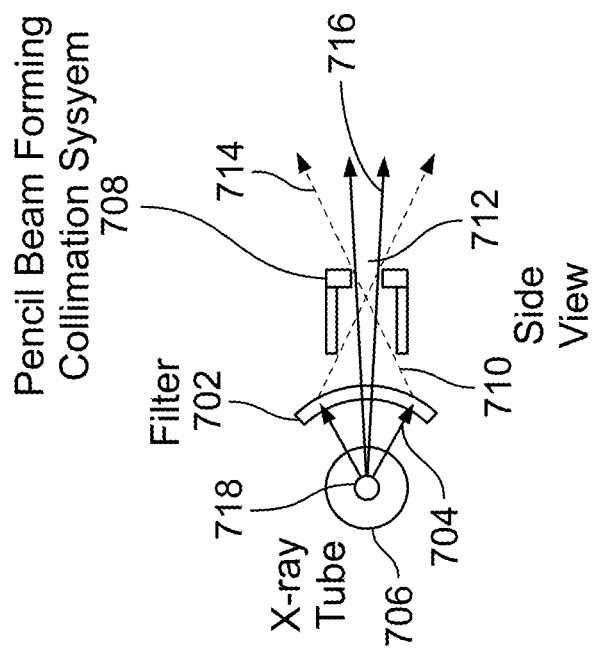
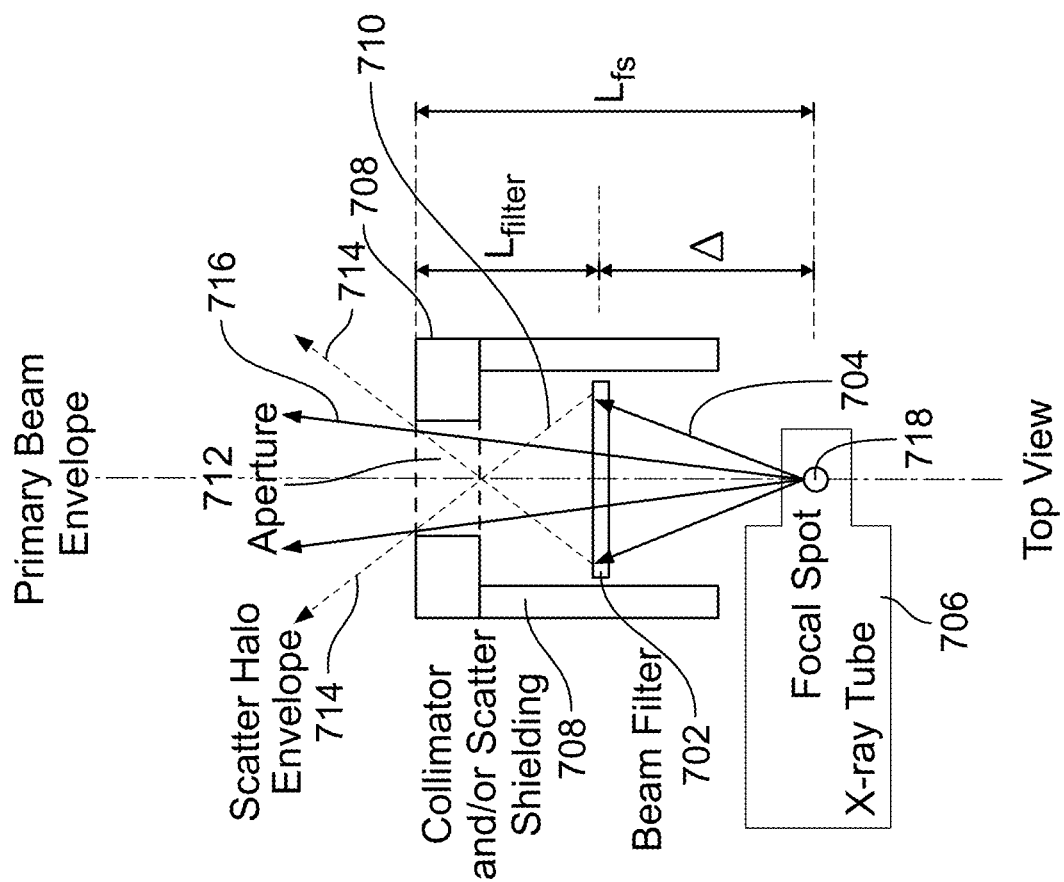
FIG. 7B
FIG. 7A

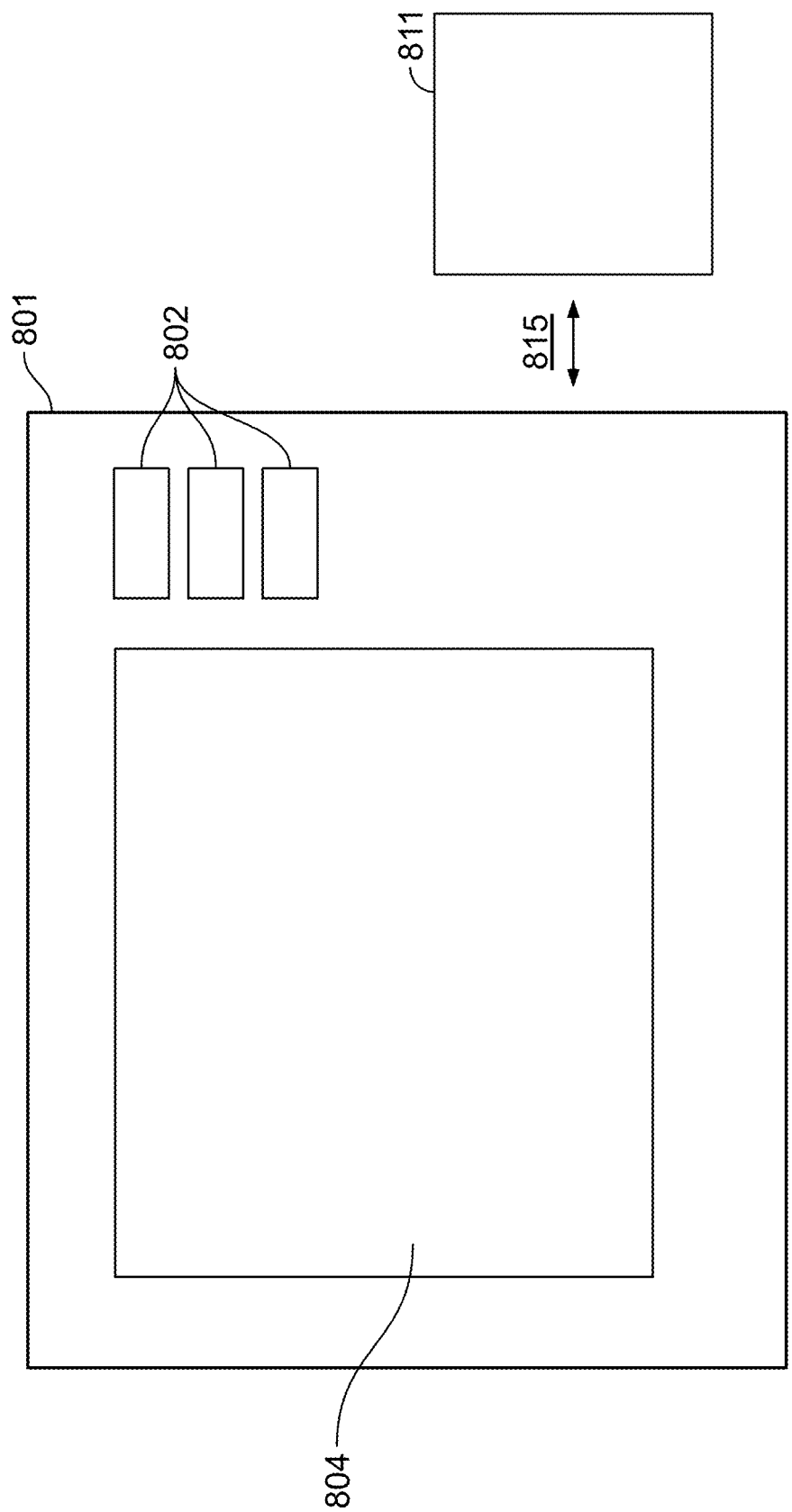

| Beam Filter<br>And resulting contrast, relative to given baseline | Scan Speed | SNR relative to given baseline system with 1mm Copper filter, 1kph scan speed, and any given system parameters such as scan distance, detector array size, etc. |
|---|---|---|
| 0.8mm Be<br>Contrast for different Z values - High<br>Penetration contrast - Low | 1 kph | 1.45x |
| | 3 kph | 0.84x |
| | 10 kph | 0.46x |
| 1.0mm Cu<br>Contrast for different Z values - Baseline<br>Penetration contrast - Baseline | 1 kph | 1.00x |
| | 3 kph | 0.58x |
| | 10 kph | 0.32x |
| 2.0mm Cu<br>Contrast for different Z values - Low<br>Penetration contrast - High | 1 kph | 0.84x |
| | 3 kph | 0.48x |
| | 10 kph | 0.26x |

FIG. 8E

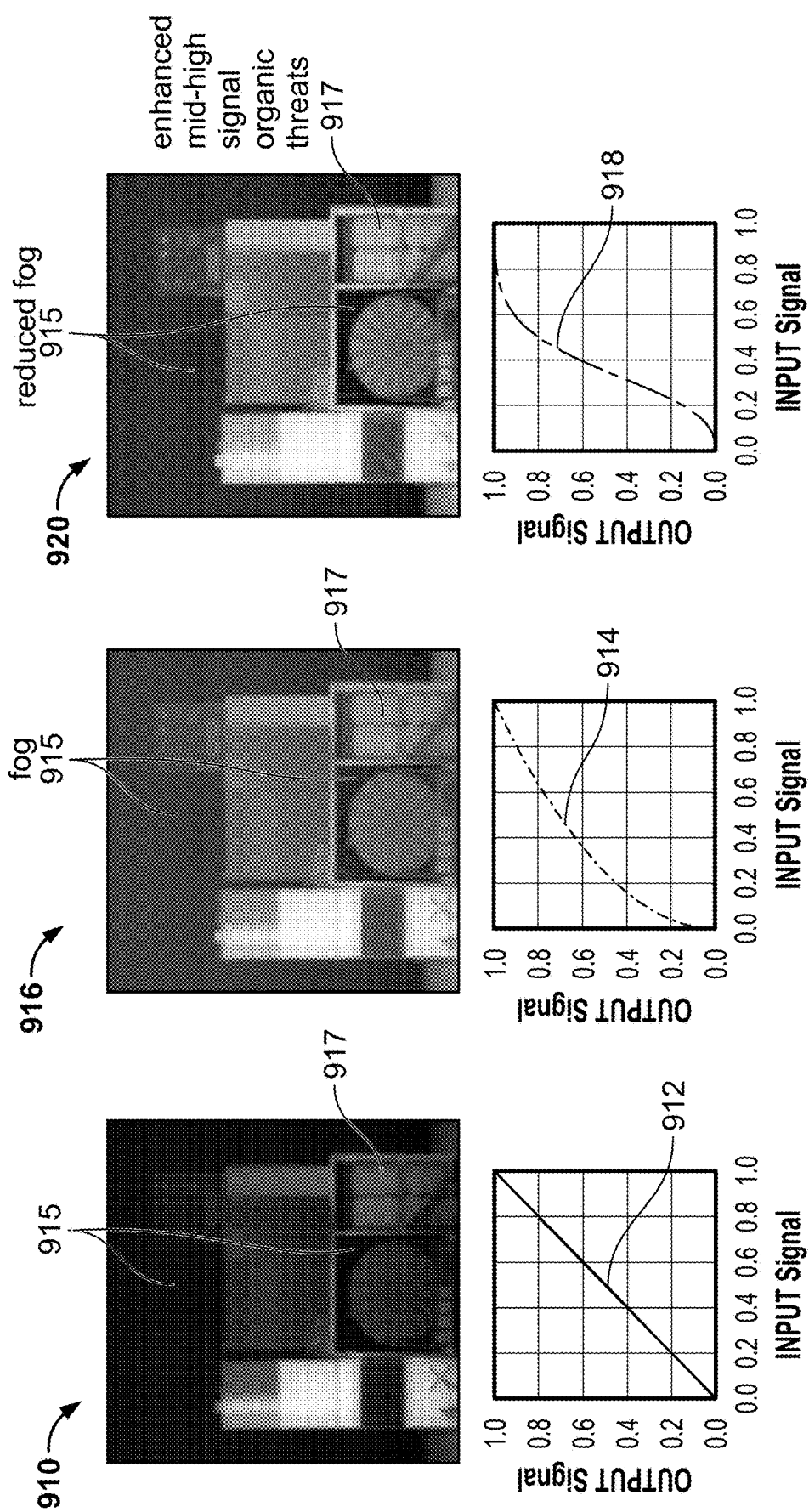

SYSTEMS AND METHODS FOR CONTROLLING IMAGE CONTRAST IN AN X-RAY SYSTEM

FIELD

The present invention relates to apparatuses and methods for controlling image contrast in transmission or backscatter X-ray inspection systems.

BACKGROUND

X-ray inspection systems typically include beam filters for filtering the inspecting X-ray beam before said beam irradiates objects being inspected. A beam filter limits the overall dose of the X-ray beam by limiting the flux and the lowest energy portion of the X-ray beam spectrum. This is desirable in certain applications, such as medical applications where energies below 30 keV are commonly understood to be absorbed by the patient's soft tissue. Similarly, in backscatter X-ray inspection systems used to inspect cargo, the lowest radiation energies may be absorbed in the cargo being irradiated. Some of the scattered radiation producing low energy radiation may be absorbed by an enclosure of the inspection system. These low energy photons are presumed to contribute to dose while not offering any benefits in exchange, so even when there is no specific dose limitation, the principle of ALARA (that the dose should be as low as reasonably achievable) motivates removal of the low energy radiation.

Application of beam filters and reduction of low energy beam spectrum components may also enable the suppression of certain portions of image data which would otherwise only show the exterior of the object being imaged, thus providing an image with a clearer view of the interior of the object.

In a backscatter X-ray inspection system, a shape of the beam spectrum impacts the quality of image obtained. Hence, controlling the shape of the beam spectrum of a backscatter X-ray inspection system can lead to optimization of the system's ability to highlight organic (or non-organic) threats in the image, particularly with reference to threats located behind a steel obscurant.

U.S. Pat. No. 9,014,339 discloses "[a] scanning apparatus for scanning a beam in a single dimensional scan, the apparatus comprising: a. a source of radiation for generating a fan beam of radiation effectively emanating from a source axis and characterized by a width; b. an angle selector, stationary during the course of scanning, for limiting the extent of the scan; and c. a multi-aperture unit rotatable about a central axis in such a manner that beam flux incident on a target is the same per revolution for different fields of view of the beam on the target, wherein the multi-aperture unit includes an inner multi-aperture hoop characterized by a hoop axis, the inner multi-aperture hoop made of material opaque to the beam, and wherein the inner multi-aperture hoop includes rings of apertures spaced laterally along the hoop axis in such a manner that axial motion of the multi-aperture hoop places a ring of apertures in the beam that is collimated by a corresponding opening angle in the angle selector."

U.S. Pat. No. 9,291,582 discloses "[a]n adjustable collimator for shaping a beam of particles, the beam of particles characterized by a dynamically swept propagation direction radial with respect to a ring of apertures rotating about an axis of rotation and serving to interrupt the beam, the swept propagation direction being transverse to the axis of rotation of the ring of apertures, the collimator comprising: a. an obscuring element substantially opaque to passage of the particles in the dynamically swept propagation direction; b. a gap in the obscuring element adapted for passage through the obscuring element of particles in the dynamically swept propagation direction, the gap characterized by a length taken along a long dimension and a jaw spacing taken along narrow dimension, both the long dimension and the jaw spacing being transverse to the dynamically swept propagation direction, wherein at least one of the length of the gap and the jaw spacing is subject to adjustment."

The prior art patents referred to above disclose the use of beam filters to reduce dose, change energy distribution of the beam, and to facilitate dual energy backscatter. However, the cited art does not disclose the use of beam filters for controlling a contrast value of scan image.

Hence, there is need for a system and method of controlling a contrast value of a scan image by using beam filters, for increasing detectability of threat materials hidden behind metal obscurants, and for enabling an operator to adjust an image to optimize an image display in accordance with his or her particular preferences. Empowering an operator to control the contrast of an image can improve his or her ability to detect threats, identify contraband, and/or improve scanning throughput.

SUMMARY

The following embodiments and aspects thereof are described and illustrated in conjunction with systems, tools and methods, which are meant to be exemplary and illustrative, and not limiting in scope. The present application discloses numerous embodiments.

In some embodiments, the present specification is directed towards an X-ray inspection system for scanning an object, the system comprising: an X-ray source configured to generate an X-ray beam for irradiating the object, wherein the X-ray beam irradiating the object defines a field of view and wherein the X-ray source is coupled with at least a first beam filter having a first thickness and a second beam filter having a second thickness greater than the first thickness; a detector array adapted to receive radiation, originating from the X-ray beam, that is transmitted through, or scattered from, the object and to generate data representative of at least one image; a processing unit configured to receive the data representative of at least one image and to generate the at least one image for display based on the data representative of at least one image; a user interface configured to receive a user input indicative of a desired level of contrast in the at least one image; and a controller configured to adjust a position of at least one of the first beam filter or the second beam filter based on the user input indicative of the desired level of contrast in the at least one image.

Optionally, the desired level of contrast comprises at least one of a first contrast level, a second contrast level, a third contrast level, or a fourth contrast level and wherein the first contrast level is less than the second contrast level, the second contrast level is less than the third contrast level, and the third contrast level is less than the fourth contrast level.

Optionally, upon the user interface receiving the user input of the first contrast level, the controller is configured to cause the first beam filter and the second beam filter to not be in the field of view of the X-ray source.

Optionally, upon the user interface receiving the user input of the second contrast level, the controller is configured to cause the first beam filter to be in the field of view of the X-ray source and the second beam filter to not be in the field of view of the X-ray source.

Optionally, upon the user interface receiving the user input of the third contrast level, the controller is configured to cause the first beam filter to not be in the field of view of the X-ray source and the second beam filter to be in the field of view of the X-ray source.

Optionally, upon the user interface receiving the user input of the fourth contrast level, the controller is configured to cause the first beam filter to be in the field of view of the X-ray source and the second beam filter to be in the field of view of the X-ray source.

Optionally, the first beam filter and the second beam filter comprise a metallic material having a high atomic number.

Optionally, the first beam filter and the second beam filter comprise at least one of bronze, tin, tungsten, copper or a copper matrix embedded with tungsten particles.

Optionally, the first beam filter and the second beam filter comprise a first layer made of tungsten or lead and a second layer made of steel or copper configured to absorb fluorescence emitted by the first layer.

Optionally, the system further comprises a shielding coupled with the first beam filter and the second beam filter configured to reduce radiation leakage.

Optionally, the system further comprises a pencil beam forming aperture placed in front of the X-ray source wherein the first beam filter is positioned between the X-ray source and the pencil beam forming aperture, and wherein image contrast increases by: increasing the distance between the pencil beam forming aperture and the first beam filter, and decreasing the distance between the first beam filter and the X-ray source.

Optionally, the system further comprises a third beam filter.

Optionally, the first beam filter, second beam filter, and third beam filter comprise a 0.5 mm thick copper material, a 1.0 mm thick copper material, and a 2.0 mm thick copper material, respectively.

Optionally, the processing unit is further configured to modify one or more nonlinear transfer functions adapted to process the data representative of at least one image based on the desired level of contrast. Optionally, the nonlinear transfer functions comprise at least one of a gamma function or a S-curve function.

Optionally, the processing unit is further configured to implement at least one of a first set of programmatic instructions or a second set of programmatic instructions based on the desired level of contrast. Optionally, the processing unit is further configured to implement the first set of programmatic instructions based on at least one of the first contrast level or second contrast level and wherein the first set of programmatic instructions comprise one or more contrast enhancement functions. Optionally, the processing unit is further configured to implement the second set of programmatic instructions based on at least one of the third contrast level or fourth contrast level and wherein the second set of programmatic instructions comprise one or more edge enhancement functions.

In some embodiments, the present specification is directed towards a method of scanning an object by using an X-ray inspection system, the method comprising: irradiating the object by an X-ray beam generated by an X-ray source, wherein the X-ray beam irradiating the object defines a field of view and wherein the X-ray source is coupled with at least a first beam filter having a first thickness and a second beam filter having a second thickness greater than the first thickness; detecting radiation, originating from the X-ray beam, that is transmitted through, or scattered from, the object and generating data representative of at least one image; generating at least one image for display based on the data representative of the at least one image; receiving a user input indicative of a desired level of contrast in the at least one image; and controlling a position of at least one of the first beam filter or the second beam filter based on the user input indicative of the desired level of contrast in the at least one image.

Optionally, receiving the user input indicative of a desired level of contrast comprises receiving at least one of a first contrast level, a second contrast level, a third contrast level, or a fourth contrast level and wherein the first contrast level is less than the second contrast level, the second contrast level is less than the third contrast level, and the third contrast level is less than the fourth contrast level.

Optionally, controlling the position of at least one of the first beam filter or the second beam filter comprises causing the first beam filter and the second beam filter to not be in the field of view of the X-ray source if a user input indicative of a first contrast level is received.

Optionally, controlling the position of at least one of the first beam filter or the second beam filter comprises causing the first beam filter to be in the field of view of the X-ray source and the second beam filter to not be in the field of view of the X-ray source, if a user input indicative of a second contrast level is received.

Optionally, controlling the position of at least one of the first beam filter or the second beam filter comprises causing the first beam filter to not be in the field of view of the X-ray source and the second beam filter to be in the field of view of the X-ray source if a user input indicative of a third contrast level is received.

Optionally, controlling the position of at least one of the first beam filter or the second beam filter comprises causing both the first beam filter and the second beam filter to be in the field of view of the X-ray source, if a user input indicative of a fourth contrast level is received.

Optionally, the first beam filter and the second beam filter comprise a metallic material having a high atomic number.

Optionally, the first beam filter and the second beam filter comprise at least one of bronze, tin, tungsten, copper or a copper matrix embedded with tungsten particles.

Optionally, the first beam filter and the second beam filter comprise a first layer made of tungsten or lead and a second layer made of steel or copper configured to absorb fluorescence emitted by the first layer.

Optionally, generating the at least one image for display based on the data representative of the at least one image comprises modifying one or more nonlinear transfer functions adapted to process the data representative of at the least one image based on the desired level of contrast.

Optionally, the one or more nonlinear transfer functions comprise at least one of a gamma function or a S-curve function.

Optionally, generating the at least one image for display based on the data representative of the at least one image comprises implementing at least one of a first set of programmatic instructions or a second set of programmatic instructions based on the desired level of contrast.

Optionally, the method further comprises implementing the first set of programmatic instructions based on at least one of the first contrast level or second contrast level, wherein the first set of programmatic instructions comprise one or more contrast enhancement functions.

Optionally, the method further comprises implementing the second set of programmatic instructions based on at least one of the third contrast level or fourth contrast level and wherein the second set of programmatic instructions comprise one or more edge enhancement functions.

In some embodiments, the present specification is directed toward a method of controlling a contrast of a scan image obtained by using an X-ray inspection system, the method comprising: irradiating the object by an X-ray beam generated by an X-ray source, wherein the X-ray beam irradiating the object defines a field of view and wherein the X-ray source is coupled with at least a first beam filter having a first thickness and a second beam filter having a second thickness greater than the first thickness; detecting radiation, originating from the X-ray beam, that is transmitted through, or scattered from, the object and generating data representative of at least one image; generating at least one scan image for display based on the data representative of the at least one image; receiving a user input indicative of a desired level of contrast in the scan image as one of a first contrast level, a second contrast level, a third contrast level, or a fourth contrast level and wherein the first contrast level is less than the second contrast level, the second contrast level is less than the third contrast level, and the third contrast level is less than the fourth contrast level; and changing a position of at least one of the first beam filter or the second beam filter with respect to the field of view of the X-ray source based on the user input indicative of the desired level of contrast in the scan image.

Optionally, changing the position of at least one of the first beam filter or the second beam filter comprises causing the first beam filter and the second beam filter to not be in the field of view of the X-ray source if a user input indicative of a first contrast level is received.

Optionally, controlling the position of at least one of the first beam filter or the second beam filter comprises causing the first beam filter to be in the field of view of the X-ray source and the second beam filter to not be in the field of view of the X-ray source, if a user input indicative of a second contrast level is received.

Optionally, controlling the position of at least one of the first beam filter or the second beam filter comprises causing the first beam filter to not be in the field of view of the X-ray source and the second beam filter to be in the field of view of the X-ray source if a user input indicative of a third contrast level is received.

Optionally, controlling the position of at least one of the first beam filter or the second beam filter comprises causing both the first beam filter and the second beam filter to be in the field of view of the X-ray source, if a user input indicative of a fourth contrast level is received.

In some embodiments, the present specification is directed toward a method of combining scan images to obtain an image having an improved detection quality, the scan images being obtained by using an X-ray inspection system, the method comprising: irradiating the object by an X-ray beam generated by an X-ray source, wherein the X-ray beam irradiating the object defines a field of view and wherein the X-ray source is coupled with at least a first beam filter having a first thickness and a second beam filter having a second thickness greater than the first thickness; obtaining a first scan image of the object by using the first beam filter; obtaining a second scan image of the object by using the second beam filter; determining one or more regions containing edges in the second image by using the first image as a guide; applying an edge enhance algorithm only to the determined regions containing edges in the second image; applying a smoothing algorithm to all regions of the second image except for the determined regions containing edges for mitigating noise of the second image for obtaining an image having an improved detection quality.

Optionally, the first image is a high resolution image.

Optionally, the second image is a high contrast image.

Optionally, determining one or more regions containing edges in the second image by using the first image as a guide comprises determining one or more regions containing edges in the first image.

Optionally, applying an edge enhance algorithm only to the determined regions containing edges in the second image comprises not applying the edge enhance algorithm to regions of the second image where there are no edges for preventing the edge enhance algorithm from enhancing noise in the regions of the second image where there are no edges.

Optionally, the method further comprises determining potential threats located in the second image; and applying graphical indicators to the first image based on the determined potential threats located in the second image for directing a human operator to analyze the threat regions.

The aforementioned and other embodiments of the present specification shall be described in greater depth in the drawings and detailed description provided below.

BRIEF DESCRIPTION OF THE DRAWINGS

These and other features and advantages of the present specification will be further appreciated, as they become better understood by reference to the detailed description when considered in connection with the accompanying drawings:

FIG. 3A is an image of a laboratory test set-up for studying organic and metallic image features that are located behind sheet metal;

FIG. 3B illustrates an X-ray image obtained using the set-up shown in FIG. 3A, wherein the organic and metallic image features are visible behind the metal sheets shown in FIG. 3A;

FIG. 6A is a diagram of a contrast beam filter employed in an X-ray collimation system, in accordance with an embodiment of the present specification;

FIG. 6B is a diagram of a contrast beam filter employed in an X-ray collimation system, in accordance with another embodiment of the present specification;

FIG. 7A is a side cross-sectional view diagram of a pencil beam collimation system employing a beam filter, in accordance with an embodiment of the present specification;

FIG. 7B is a top cross-sectional view diagram of a pencil beam collimation system employing a filter, as shown in FIG. 7A;

FIG. 8A depicts an exemplary graphical user interface for enabling an operator to adjust the contrast of an image, in accordance with an embodiment of the present specification;

FIG. 8E is a table illustrating a correlation between beam filter thickness, scan speed, and signal to noise ratio values, in accordance with an embodiment of the present specification;

FIG. 9B is a backscatter image processed by using a linear function, in accordance with an embodiment of the present specification;

FIG. 9C illustrates the backscatter image of FIG. 9B processed by using a Gamma transfer function, in accordance with an embodiment of the present specification;

FIG. 9D illustrates the backscatter image of FIG. 9B processed by using a S-Curve transfer function, in accordance with an embodiment of the present specification;

DETAILED DESCRIPTION

Figure 1A:
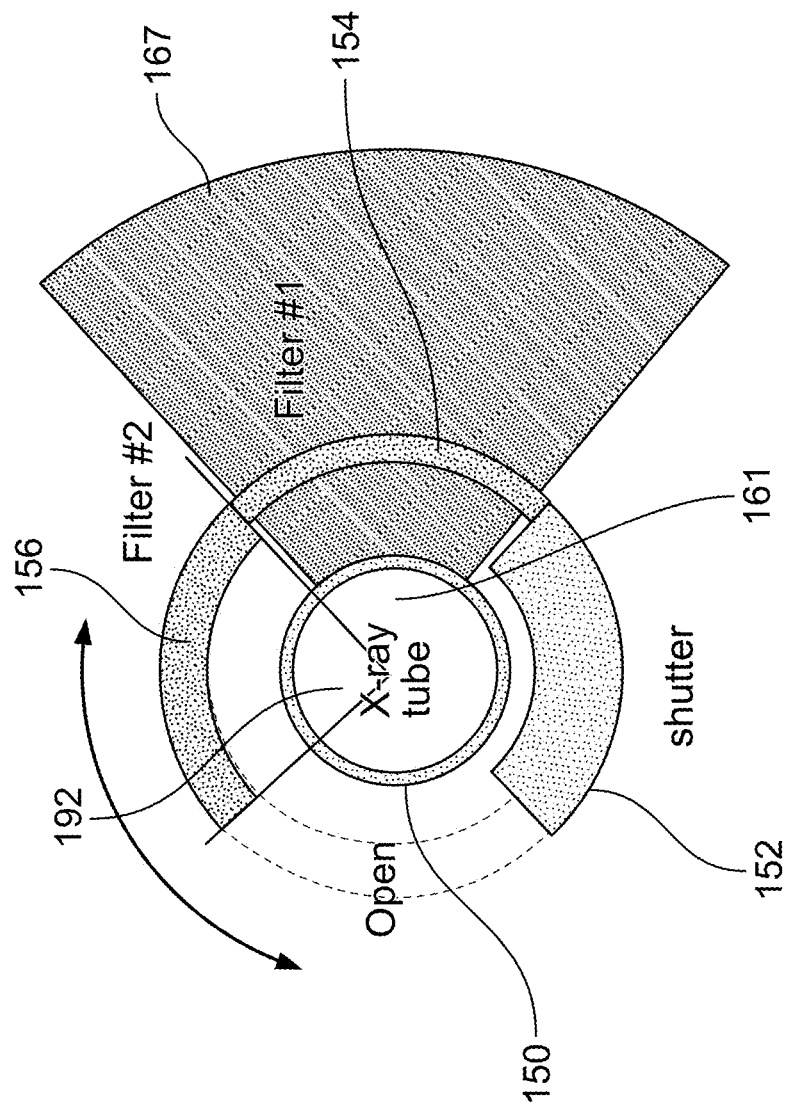
FIG. 1A is a diagram illustrating a system for integrating a variable beam filter with a mechanical beam shutter of an X-ray source, in accordance with an embodiment of the present specification.

The present specification provides a method of controlling backscatter image quality based on an extent of beam filtration provided in an X-ray inspection system. In embodiments, the present specification provides a backscatter inspection system wherein a plurality of beam filters of varying thicknesses are deployed, in various positions, to filter an X-ray beam configured to irradiate an object, thereby resulting in scan images having varying contrast values depending upon a thickness and position of beam filter used.

Definitions:

The terms "image penetration" and "penetration contrast" refer to the property of contrast between an image target and its surroundings, with the target located behind an obscurant in a radiation image.

The term "image contrast" or "contrast" refers to a level of luminance or color of pixels in an image that makes objects represented by the pixels visually distinguishable from each other. Modifying contrast therefore means causing the level of luminance or color of one or more pixels in an image to increase, decrease or otherwise change in value, thereby effecting how such pixels are visually differentiated from each other.

The term "signal to noise ratio (SNR)" is defined as (mean signal/pixel)/(standard deviation).

The term "flux" is defined as a measure of the number of X-ray photons in a radiation image used to form the image.

The term "spectrum hardness" is defined as a Bremsstrahlung spectrum which has been filtered to preferentially attenuate lower energy components.

Where an element is described as being "on," "connected to," or "coupled to" another element, it may be directly on, connected or coupled to the other element, or, alternatively, one or more intervening elements may be present, unless otherwise specified.

In various embodiments, a "computing device/controller" includes an input/output interface, at least one communications interface and system memory. In various embodiments, the computing device/controller includes conventional computer components such as a processor, necessary non-transient memory or storage devices such as a RAM (Random Access Memory) and disk drives, monitor or display and one or more user input devices such as a keyboard and a mouse. In embodiments, the user input devices allow a user to select objects, icons, and text that appear on the display/monitor, displaying a graphical user interface, via a command such as a click of a button on a mouse or keyboard or alternatively by touch in embodiments where the display is a touch-enabled screen. The computing device/controller may also include software that enables wireless or wired communications over a network such as the HTTP, TCP/IP, and RTP/RTSP protocols. These elements are in communication with a central processing unit (CPU) to enable operation of the computing device/controller. In various embodiments, the computing device/controller may be a conventional standalone computer, a mobile phone, a tablet or a laptop. In some embodiments, the functions of the computing device/controller may be distributed across multiple computer systems and architectures.

In some embodiments, execution of a plurality of sequences of programmatic instructions or code enables or causes the CPU of the computing device/controller to perform various functions and processes. In alternate embodiments, hard-wired circuitry may be used in place of, or in combination with, software instructions for implementation of the processes of systems and methods described in this application. Thus, the systems and methods described are not limited to any specific combination of hardware and software.

The terminology used herein is for the purpose of describing particular embodiments and is not intended to be limiting. The singular forms "a," "an," and "the," are intended to include the plural forms as well.

The present specification is directed towards multiple embodiments. The following disclosure is provided in order to enable a person having ordinary skill in the art to practice the specification. Language used in this specification should not be interpreted as a general disavowal of any one specific embodiment or used to limit the claims beyond the meaning of the terms used therein. The general principles defined herein may be applied to other embodiments and applications without departing from the spirit and scope of the specification. Also, the terminology and phraseology used is for the purpose of describing exemplary embodiments and should not be considered limiting. Thus, the present specification is to be accorded the widest scope encompassing numerous alternatives, modifications and equivalents consistent with the principles and features disclosed. For purpose of clarity, details relating to technical material that is known in the technical fields related to the specification have not been described in detail so as not to unnecessarily obscure the present specification.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

In an embodiment, the present specification provides a system for changing the thickness of a beam filter applied to an X-ray beam. FIG. 1A is a diagram illustrating a system for integrating a variable beam filter with a mechanical beam shutter of an X-ray source, in accordance with an embodiment of the present specification. As shown, X-ray source 150 is coupled with a shutter 152 which can cover the source 150 if required. The shutter 152 is coupled with a first beam filter 154 and a second beam filter 156. By using the two beam filters, at least three different beam spectrum shapes may be generated, one each with the use of filter 154, 156 and one without applying any of the two filters. In an alternate embodiment, a different design of beam filters employing a sliding mechanism may also be used for obtaining a desired number of beam filters and corresponding shapes of beam spectrum.

Figure 1D:
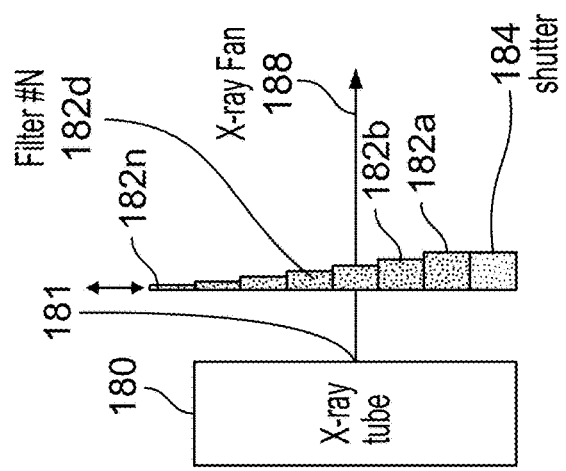
FIG. 1D illustrates a top view of an X-ray source coupled with a shutter and a plurality of filters, in accordance with an embodiment of the present specification.
Figure 1C:
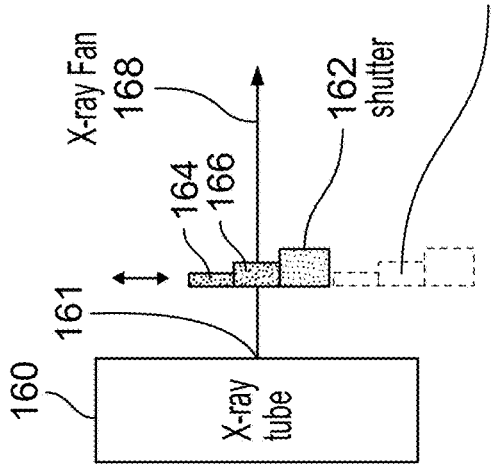
FIG. 1C illustrates a top view of a shutter and a filter mechanism as shown in FIG. 1B.
Figure 1B:
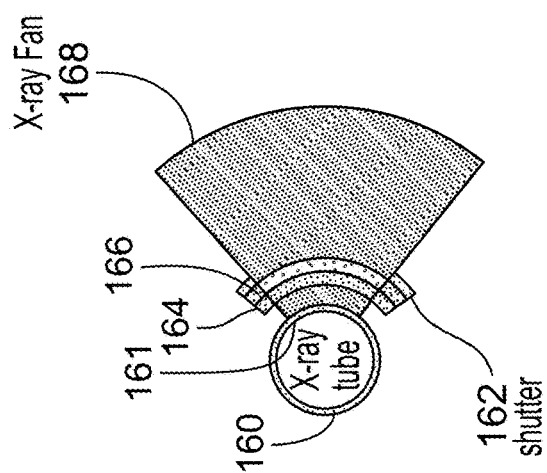
FIG. 1B is a side-view diagram illustrating a system for integrating a variable beam filter with a mechanical beam shutter of an X-ray source, in accordance with another embodiment of the present specification.

FIG. 1B is a side-view diagram illustrating a system for integrating a variable beam filter with a mechanical beam shutter of an X-ray source, in accordance with another embodiment of the present specification. In embodiments, an X-ray beam is generated by using an X-ray source 160 and a beam forming aperture 161. As shown in FIG. 1B, the X-ray source 160 is coupled with a shutter 162 which can be slid over to cover beam forming aperture 161, if required. The shutter 162 is coupled with a beam filter 164 and a beam filter 166. In the embodiment shown in FIG. 1B, the shutter 162 and the filters 164, 166 are configured to be moved parallel to the axis of the X-ray source 160 for covering the beam forming aperture 161 and for obtaining different filter configurations. In the exemplary configuration shown in FIG. 1B, the aperture 161 is covered by beam filter 166. The aperture 161 and the beam filter 166 are in the same plane. For obtaining a different filter configuration, the beam filter 166 is moved out of the plane of the aperture 161, while the beam filter 164 is moved into the plane of the aperture 161, and is thus configured to cover the aperture 161.

FIG. 1C illustrates a top view of a shutter and a filter mechanism as shown in FIG. 1B. During operation, as shown in FIG. 1C, filter 166 is translated and placed in front of beam forming aperture 161 to generate filtered X-ray beam 168, while shutter 162 and filter 164 are slid into positions that are offset from and not in front of the beam forming aperture 161 as shown. Dotted lines 170 depict the position of the shutter 162 and filters 164, 166 in an open position, where in an open position, shutter 162 and filters 164, 166 are not covering beam forming aperture 161. In embodiments, an infinite number of filters may be used in the design illustrated in FIG. 1B, as the angular field of view of the source places no limitation on the number of filters that can be employed. FIG. 1D illustrates a top view of an X-ray source 180 coupled with a shutter and a plurality of filters, in accordance with an embodiment of the present specification. As shown in the figure, any of the filters 182a, 182b . . . 182n or shutter 184 can be translated to cover a beam forming aperture 181 coupled with the X-ray source 180 to obtain a desired beam filtration. As shown, a filtered X-ray fan beam 188 is obtained when one of the filters 182a, 182b . . . 182n is positioned in front of the beam forming aperture 181.

Referring to FIG. 1A, in various embodiments, the use of minimal beam filtration through, for example, the application of a first filter 154, enhances the lowest energy components of the beam spectrum. By using minimal beam filtration, high signal to noise ratio images which are aesthetically pleasing may be obtained. Also, minimal beam filtration leads to maximization of contrast between low atomic number materials (e.g. plastic) and high atomic number materials (e.g. steel), as well as maximization of spatial resolution particularly for features on an exterior of a target. This enhances the detectability of organic threats which may be hidden behind a thin obscurant such as but not limited to a cloth sided truck. Minimal beam filtration also results in better contrast, which leads to better detectability of thin organic threats over a thick or opaque organic background. The contrast for a thin organic target over a thick organic background also benefits from a softer beam spectrum. This form of contrast is named "layer contrast" in the ANSI-N42.46 standardized test of image quality for cargo backscatter X-ray inspection systems.

In various embodiments, increased beam filtration through, for example, the application of a second filter 156, is applied in order to maximize the contrast between organic and metallic objects in a radiation image for targets that are behind a metallic obscurant, such as within a vehicle. Low energy components of an X-ray beam spectrum have a low probability of penetrating the obscurant, but a high probability of interacting near the surface of the obscurant, and so serve only to produce an image of the obscurant. Application of a beam filter reduces the low energy components enabling suppression of image data which only shows the exterior of the object being imaged and thereby enhancing a view of the interior of the object.

Figure 2A:
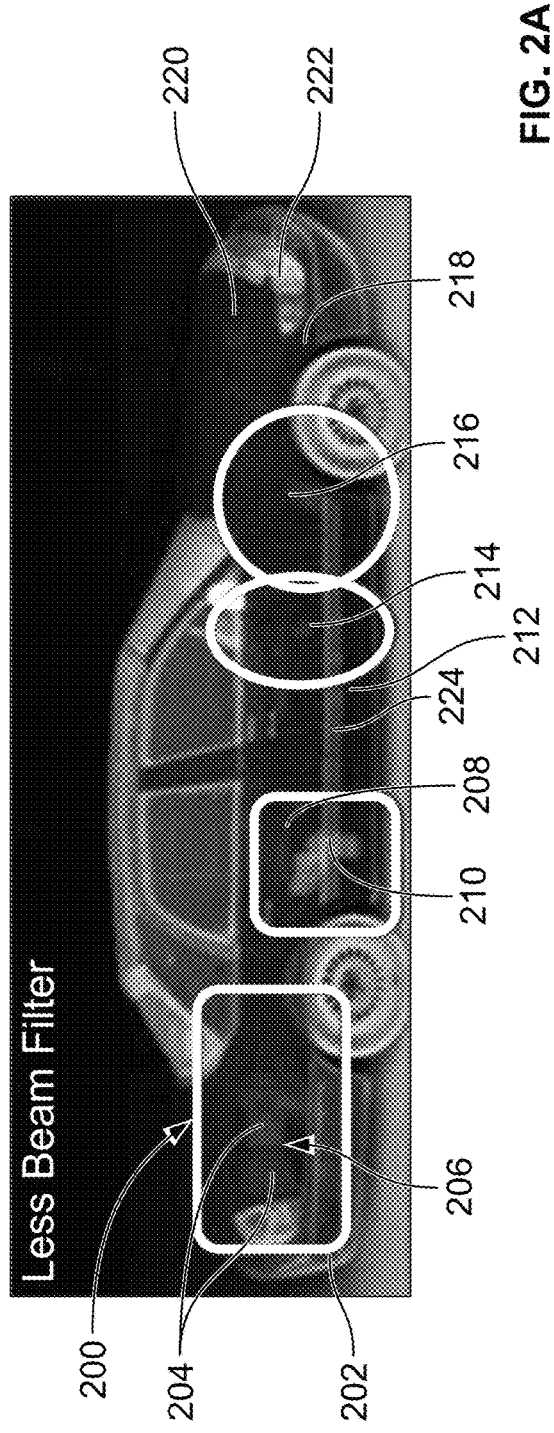
FIG. 2A illustrates an effect of applying a beam filter on a backscatter X-ray image of a car containing several organic threats and a metallic artillery shell.
Figure 2B:
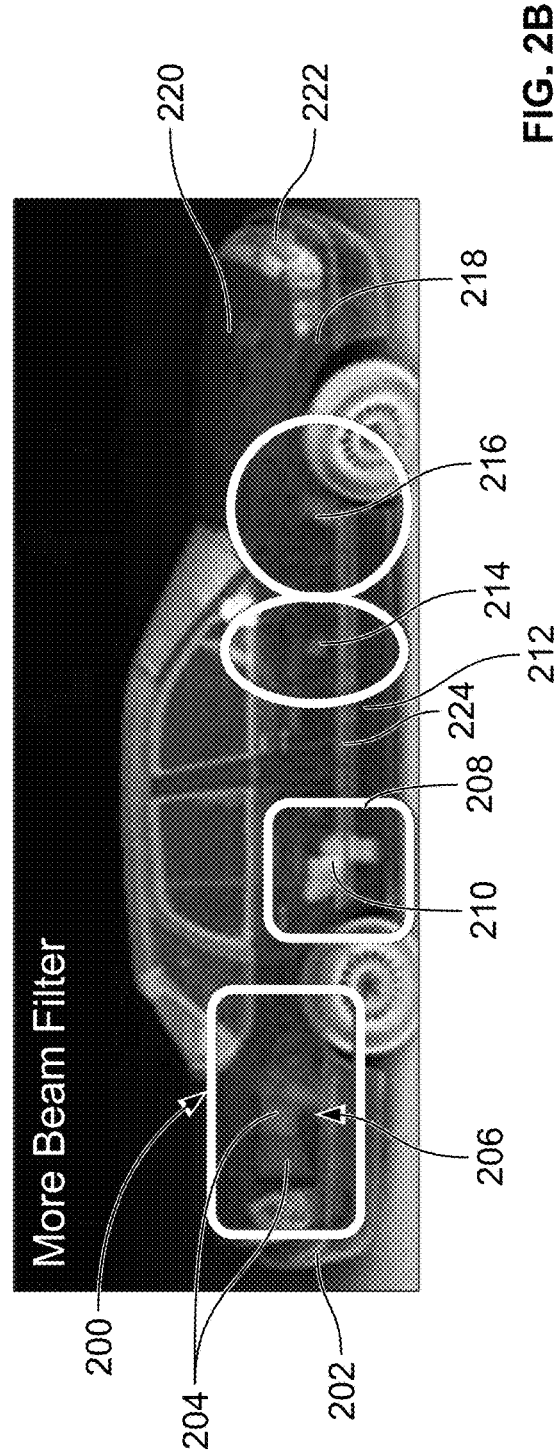
FIG. 2B illustrates an effect of applying a beam filter, stronger than that shown in FIG. 2A, on the backscatter X-ray image of a car containing several organic threats and a metallic artillery shell.

FIG. 2A illustrates an effect of applying a beam filter on a backscatter X-ray image of a car containing several organic threats and a metallic artillery shell. FIG. 2B illustrates an effect of applying a beam filter, stronger than that shown in FIG. 2A, on the backscatter X-ray image of a car containing several organic threats and a metallic artillery shell. Referring to both FIGS. 2A and 2B, a car 200 comprises a trunk 202 containing two large canisters of explosive simulant 204, and a 155 mm artillery shell 206 (which is seen in the figure as a dark object) near the bottom of the canisters 204. Rear door 208 contains several packages of simulated drugs 210 within the door panels. Front door 212 contains a smaller package of simulated drugs 214. An additional package of simulated drugs 216 is located in front wheel well 218. Since the beam filter applied in FIG. 2A is less than that applied in FIG. 2B, it can be seen in FIG. 2A that headlights 222, and the plastic side trim 224, appear brighter as compared to the metal body of the car 200, which appears darker in the image. In FIG. 2B, since the beam filtration is more than that applied with respect to FIG. 2A, all of the organic threats within the car appear brighter, relative to their surroundings. The artillery shell 206, which is only seen as a shadow against the canisters of organic material 204 in the trunk 202 in FIG. 2A, has better visual contrast in FIG. 2B because the organic background 204 appears brighter than in FIG. 2A.

The contrast between metallic objects and air is also enhanced with the increase in beam filtration. As can be seen in FIG. 2A, the trunk 202 and hood 220 of the car 200 almost blend into the background, however in FIG. 2B, the transition from steel object to background is clearly defined. Further, it can be seen that the artillery shell 206 appears brighter in FIG. 2B. Hence, if the artillery shell 206 was presented with a dark background, it would be detectable within FIG. 2B but would be very difficult to detect in FIG. 2A.

FIG. 3A is an image of a laboratory test set-up for studying organic and metallic image features that are located behind sheet metal. FIG. 3B illustrates an X-ray image obtained using the set-up shown in FIG. 3A, wherein the organic and metallic image features are visible behind the metal sheets shown in FIG. 3A. FIGS. 3A and 3B show a laboratory test setup with a variety of image targets, including image quality indicators for resolution, a step wedge for penetration, and several practical image targets meant to mimic the physical conditions of threats or contraband hidden in a vehicle. Referring to FIGS. 3A and 3B, set up 300 comprises a metal safe 302 comprising a handgun 304, a first metal sheet 306 with simulants 308 for drugs, explosives, and cash hidden behind the sheet 306 and a second metal sheet 310 with a simulated pipe bomb 312 hidden behind the sheet 310. Bags of sugar 314 acting as simulant for all types of organic threats, including drugs and explosives are also placed behind sheet 310 which is made of steel and is 0.048" (1.2 mm) thick, simulating a car trunk which may represent either VBIED or a smuggling scenario. Sheets 306 and 310, and the metal safe 302 have a thickness ranging from 1-2 mm and are made of steel. The test setup 300 sits on a conveyor belt (not visible in the image) in front of an imaging module (not shown) which contains a 220 keV X-ray source and imaging hardware similar to that of a commercial backscatter imaging product designed for the inspection of automobiles and cargo trucks.

Figure 3C:
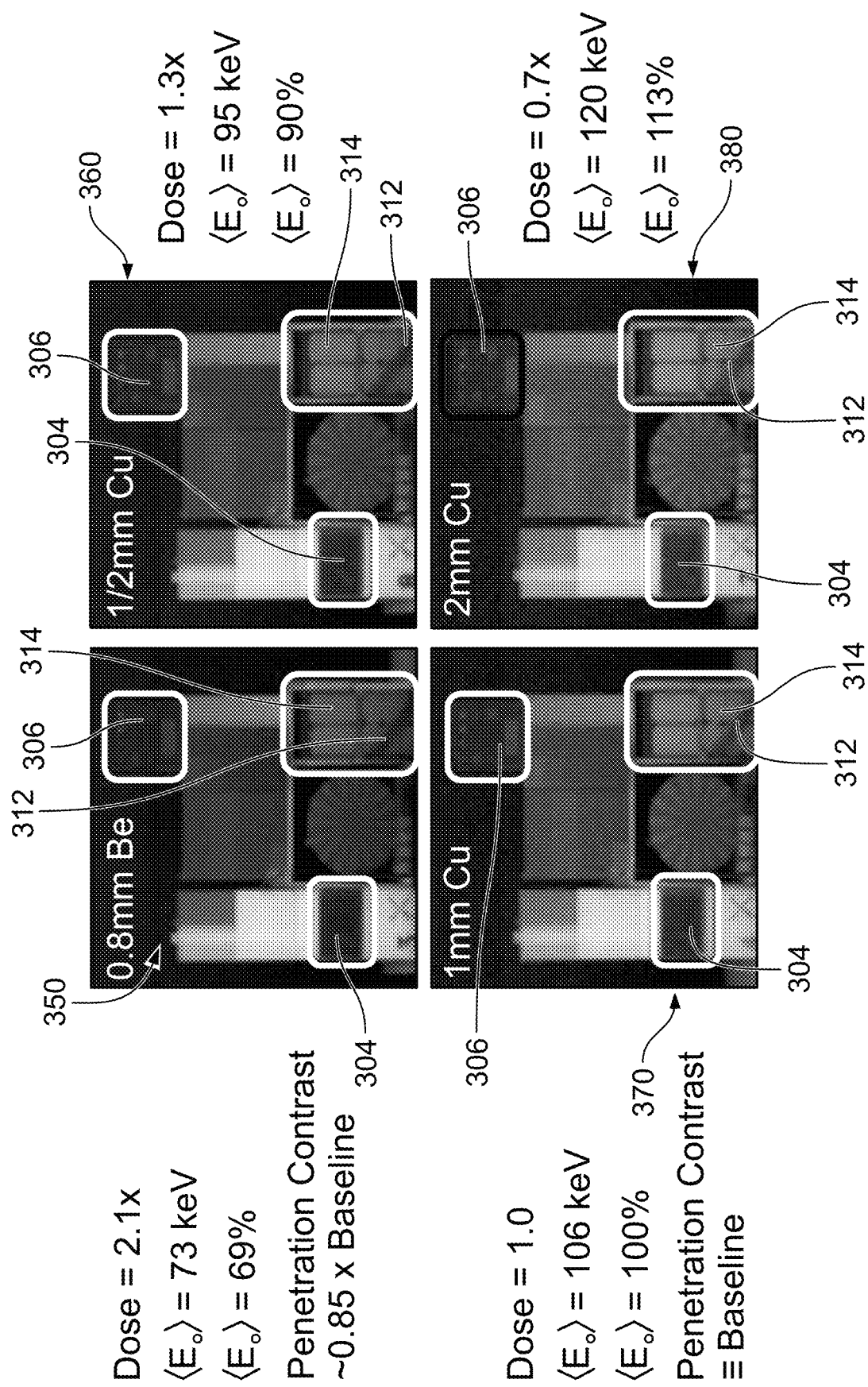
FIG. 3C illustrates radiation images of the set-up of FIG. 3A obtained by using four different beam filter conditions.

FIG. 3C illustrates radiation images of the set-up of FIG. 3A obtained by using four different beam filter conditions. Image 350 is obtained by using a 0.8 mm Beryllium vacuum window over an X-ray source used to image the set-up 300. Hence, image 350 is obtained by using a negligible, or zero beam filtration. Images 360, 370 and 380 are obtained by using 0.5 mm, 1.0 mm, and 2.0 mm thick copper beam filters respectively. As can be seen in FIG. 3C, the visibility of the bags of sugar 314 is enhanced progressively from the no filtration image 350 to the maximum filtration image 380, illustrating that visual detectability of organic threats is improved with an increase in thickness of beam filters applied.

In an embodiment, image 350 has a flux of 125%, a signal to noise ratio (SNR) of 37.1 or 112%, at a radiation dosage of 10.1 uR or 124%; image 360 has a flux of 78%, a signal to noise ratio (SNR) of 29.4 or 88%, at a radiation dosage of 6.1 uR or 74%; image 370 has a flux of 57%, a signal to noise ratio (SNR) of 25 or 75%, at a radiation dosage of 4.7 uR or 58%; and Image 380 has a flux of 37%, a signal to noise ratio (SNR) of 20.1 or 60%, at a radiation dosage of 3.1 uR or 37%. Hence, even though the low filtration image 350 is more aesthetic with darker background and sharper edges, the higher filtration images 360, 370, and 380 provide better visual detection of threat items hidden behind 1 mm of steel at a substantially lower radiation dose. The addition of 2 mm of copper beam filtration (image 380) shifts the average energy of the beam from 73 keV in image 350 to 120 keV in image 380, while reducing the X-ray dose by a factor of 3x, and reducing the SNR by a factor of 1.8x. This SNR reduction is equivalent to a reduction of photon flux by a factor of 3.4x.

As shown in FIG. 3C, image 360 with the 0.5 mm beam filter, provides a dramatic increase in visual detectability and increases the average energy of the primary beam spectrum by ~30%, from 73 keV in image 350 to 95 keV in image 360. Each of the subsequent images 370 and 380 provide a higher level of detectability and increase the average energy by 12-13%, from 95 keV in image 360 to 106 keV in image 370 to 120 keV in image 380. Each increase in average energy allows a relatively greater fraction of the primary X-ray beam to penetrate the steel obscurant and create a scatter signal from the target behind the obscurant. Hence, it is evident that the greater relative signal from the target of interest provides a greater signal and greater contrast relative to the surroundings for a given threat. The image study of FIG. 3C shows empirically that this benefit outweighs the cost (in SNR, and aesthetic image smoothness) of removing overall flux from the beam in order to obtain a harder beam from which lower energy photons have been removed.

As can be seen in FIG. 3C, in addition to enhancing detectability of the organic sugar 314 behind sheet 310, a thin plastic (organic) plate on the handle as well as metallic sides of the handgun 304 within safe 302, become more noticeable progressively as the beam filter thickness is increased. Further, while the shape of the simulants 308 for drugs, explosives, and cash hidden behind the sheet 306 are gradually obscured by the reduced flux from the greater filter thickness in images 360, 370, 380, the apparent brightness of the simulant objects 308 is enhanced by increasing beam filter thickness, and some of the smaller simulants 308 which are barely detectible or entirely invisible in the no-filter image 350, become more apparent after a beam filter is employed as can be seen in images 360, 370, 380.

It is apparent from FIG. 3C that the spatial resolution of the no-filter image 350 is better than the images 360, 370, 380 obtained after application of beam filtration. In different scenarios, either of the properties of spatial resolution or contrast may be more desirable. However, for enhancing visibility of objects near the edge of detectability, such as the metal slide of the handgun 304, or the simulant objects 308, spatial resolution offers little value to detection, and the added contrast from the beam filter is critical.

For a quantitative measure of relative image signal, each of the images 350, 360, 370 and 380 is scaled to have the same minimum and maximum pixel values. The average signal from a set of pixels in a roughly uniform region of interest at the location of one of the organic threats (such as sugar bags 314) located behind a steel obscurant (such as sheet 310) in each of the scaled images, are then compared.

Figure 3D:
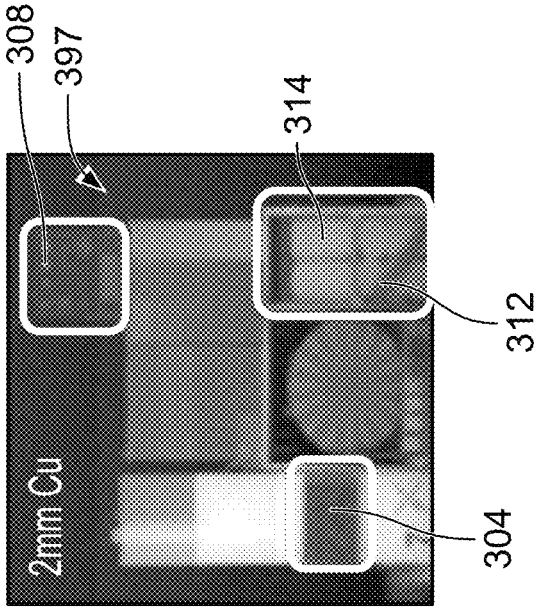
FIG. 3D illustrates radiation images of the set-up of FIG. 3A obtained by using different filter thicknesses, beam powers and scan speeds.
Figure 3D:
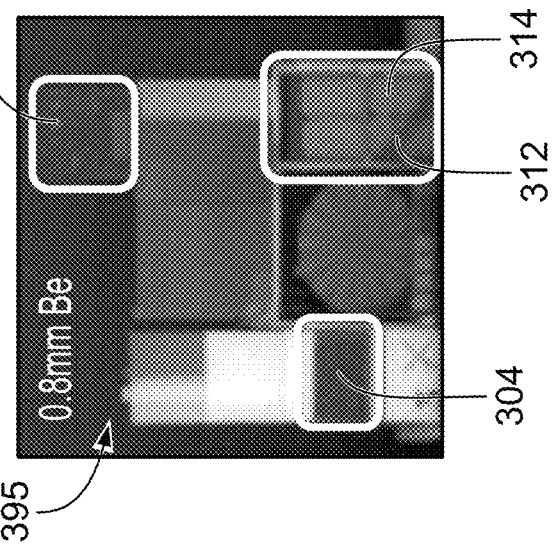

FIG. 3D illustrates radiation images of the set-up of FIG. 3A obtained by using different filter thicknesses, beam powers and scan speeds. Referring to FIGS. 3A, 3B, 3C and 3D, image 395 is obtained by using a 0.8 mm Beryllium vacuum window over an X-ray source used to image the set-up 300. Hence, image 395 is obtained by using a negligible, or zero beam filtration. Image 397 is obtained by using a 2.0 mm thick copper beam filter. Further, the beam power used to obtain image 397 is three times that used to obtain image 395. As can be seen in FIG. 3D image 397 is grainer than image 395. However, the contrast benefits of the 2 mm Copper beam filter are identical to the image 380 shown in FIG. 3C. Further, the detectability of sugar bags 314 as well as the simulants 308 for drugs, explosives, and cash is increased greatly in image 397 as compared to image 395. Hence, even with different power adjustments, the contrast motivated beam filter of the present specification provides enhanced detectability of organic threat materials hidden behind steel sheets.

It has been observed that the effect of scan speed on dose and image quality is identical to that of varying beam power. Changing the scan speed by ½x is the same as increasing beam power by 2x, so by reducing the scan speed, an image quality identical to image 397 is obtained. In various embodiments, a plurality of beam filters of varying thickness can be employed with varying scan speeds to provide the same dose in each case for obtaining high contrast images such as image 397.

In an embodiment, the variable beam filter of the present specification can be combined with a mobile backscatter vehicle inspection system which is typically an imaging module built into a panel van or small truck. The drive speed, and thus the horizontal scanning speed, is controlled by the accelerator pedal of the truck. In order to achieve high-quality low-speed scanning, some mobile backscatter vehicle inspections systems use a mechanical scan drive. As an example, the AS&E MobileSearch Backscatter truck has two scan speeds, 3 inches/second (~¼ km/h) and 6 inches/second (~0.5 km/h), both of which are controlled by a motorized high friction drum which engages with one of the truck's tires to turn the wheel and drive the vehicle. In an embodiment, a thick filter is used in conjunction with the mechanical scan drive of the inspection system to obtain low scan speeds, resulting in radiation images having improved contrast and threat visibility.

Figure 3E:
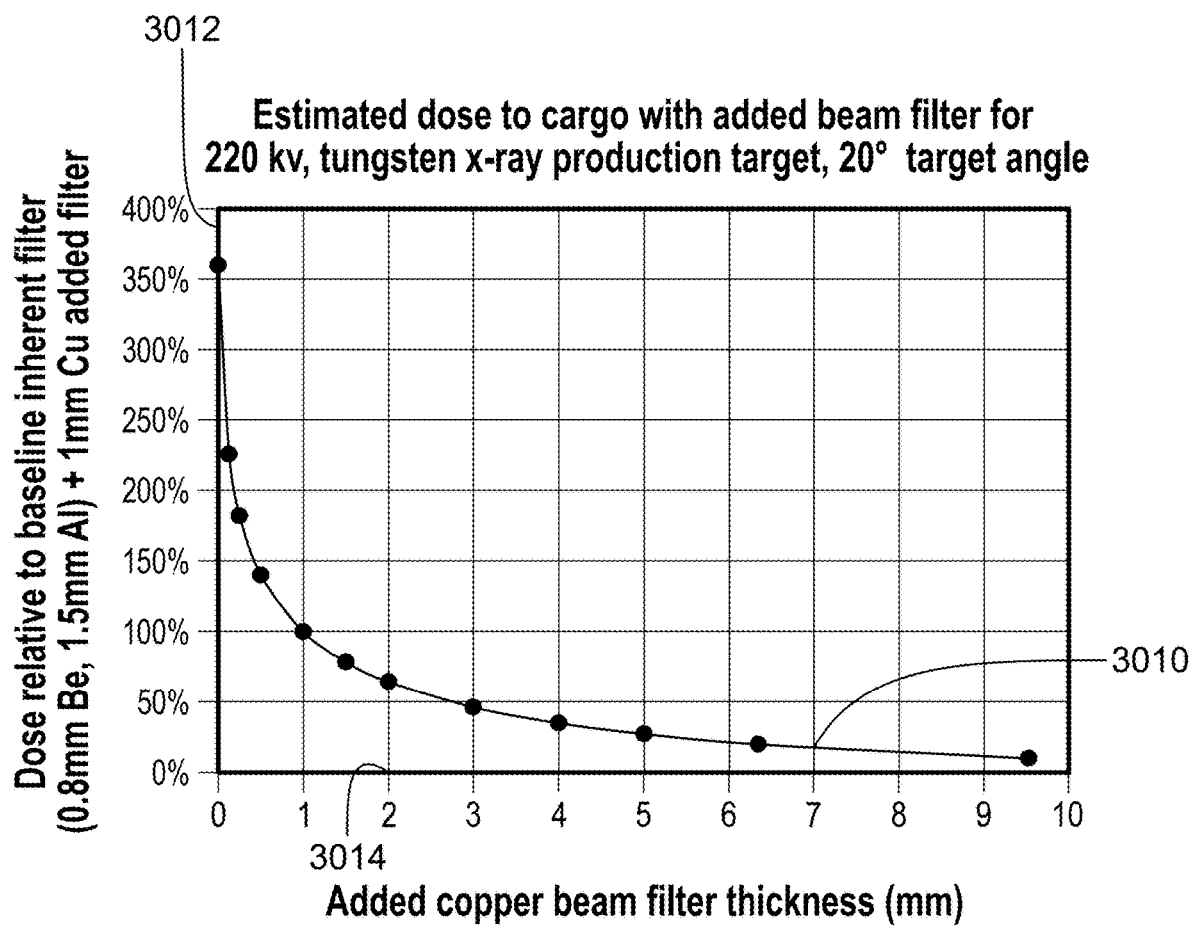
FIG. 3E is a graph illustrating the relationship between X-ray dose corresponding to different thickness of beam filters.

In an embodiment, where dose-to-cargo limitations are applicable to the inspection system, the mechanical controls that select the beam filter are coordinated with the controls that select the scan speed, to maintain a constant dose in the inspection system. In various embodiments, the relationship between beam filter thickness and dose reduction is nonlinear and nontrivial but may be calculated by using known methods. FIG. 3E is a graph illustrating the relationship between X-ray dose corresponding to different thicknesses of beam filters. Y-axis 3012 of plot 3010 depicts dose relative to baseline inherent filter and X-axis 3014 depicts filter thickness. As shown by the plot 3010 the X-ray dose decreases with the increase in filter thickness. In an embodiment, where the dose-to-cargo limitations are not applicable, a system operator may select a beam filter for a desired level of contrast, as well as separately select a scan speed for the desired level of flux, in trade for scan time. In various embodiments, due to the low scan speed facilitated by the mechanical scan drive, contrast levels greater than that demonstrated at 220 keV and using a 2 mm copper filter in image 380 shown in FIG. 3C are obtained with an arbitrarily high SNR.

In embodiments, where the system operator selects a high contrast, a high scan speed, and a high signal to noise ratio, the system power may be limited, resulting in a trade-off between high contrast and scan speed and low power. Accordingly, in one embodiment, the system automatically performs a trade-off analysis to determine the highest contrast possible for a desired, inputted scan speed and signal to noise ratio and operates the scan at the highest possible contrast, which may be below the operator-inputted desired level of contrast. In another embodiment, the system automatically performs a trade-off analysis to determine the highest possible signal to noise ratio for a desired, inputted scan speed and contrast and operates the scan at the highest possible signal to noise ratio, which may be below the operator-inputted desired signal to noise ratio. In another embodiment, the system automatically performs a trade-off analysis to determine the fastest possible scan speed for a desired, inputted signal to noise ratio and contrast and operates the scan at the highest possible scan speed, which may be below the operator-inputted desired scan speed.

In various embodiments, scan speeds of typical cargo inspections systems range from approximately 1 kilometer per hour (km/h) to 10 km/h. For example, for inspection systems that may be conveyed on rails, for scanning systems where target vehicles are towed past an imager by a carwash-style mechanism, and for vehicle mounted scanning systems with a scan drive, minimum scan speeds ranging approximately between 0.1 km/h and 0.3 km/h can be achieved, in some embodiments. In another example, for vehicle based scanning systems where the speed is driver-controlled (with an accelerator pedal or other device), and for stationary scanning systems where a target vehicle is required to drive past the stationary scanning system, it is usually difficult to control and achieve scanning speeds lower than approximately 1 km/h to 2 km/h. In various embodiments, a maximum scan speed of 10 km/h may be achieved, as scan speeds higher than 10 km/h result in low image quality and reduced safety. In some embodiments, however, there is no limit to allowable maximum scan speed. Accordingly, in one embodiment, the trade-off analysis performed by the system is bounded by a minimum scan speed of 0.5 km/h, more preferably 1 km/hr, and bounded by a maximum scan speed of 20 km/h, preferably 10 km/h.

In various embodiments, scanning systems deliver a radiation dose to cargo ranging between 1 µR/scan (microRems/scan) and 25 µR/scan. In an embodiment, a minimum dose value of 1 µR/scan may be delivered to an object being scanned, as a dosage lower than 1 µR/scan results in a low image quality. As is known, the relationship between dose and image quality depends on a plurality of parameters such as, but not limited to, detector size and/or beam size. In some embodiments, there is no lower limit to the allowed dose. A maximum dose for a vehicle being scanned with personnel still inside the vehicle is typically limited by local laws or commonly accepted safety standards, which in some embodiments, is no more than 10 µR/scan or no more than 25 µR/scan. The maximum dosage threshold may be the same even for unoccupied vehicles, due to the possibility that humans may be present as smuggled cargo in the vehicles.

SNR metrics are based on both individual parameters of the imaging system and on the method being used to measure the value of SNR. In an embodiment of the present specification, a typical SNR value corresponds to the baseline image 370 shown in FIG. 3C. The image 380 shown in FIG. 3C has a SNR value of approximately 0.84x relative to the baseline image 370. In an embodiment, a minimum acceptable SNR value is approximately in the range of one-half (½)x or one-third (⅓)x relative to the SNR value of the baseline image 370. In an embodiments, a minimum acceptable SNR value is approximately in the range of one-fourth (¼) to one-tenth (¹/₁₀) of the image flux. In embodiments, there is no maximum acceptable SNR value, as the value of SNR is limited by the capability of the scanning system with respect to parameters such as, but not limited to cost, weight, and scan time. Accordingly, in one embodiment, the trade-off analysis performed by the system is bounded by a minimum acceptable SNR in a range of ¼ to ¹/₁₀ of the image flux.

Figure 4:
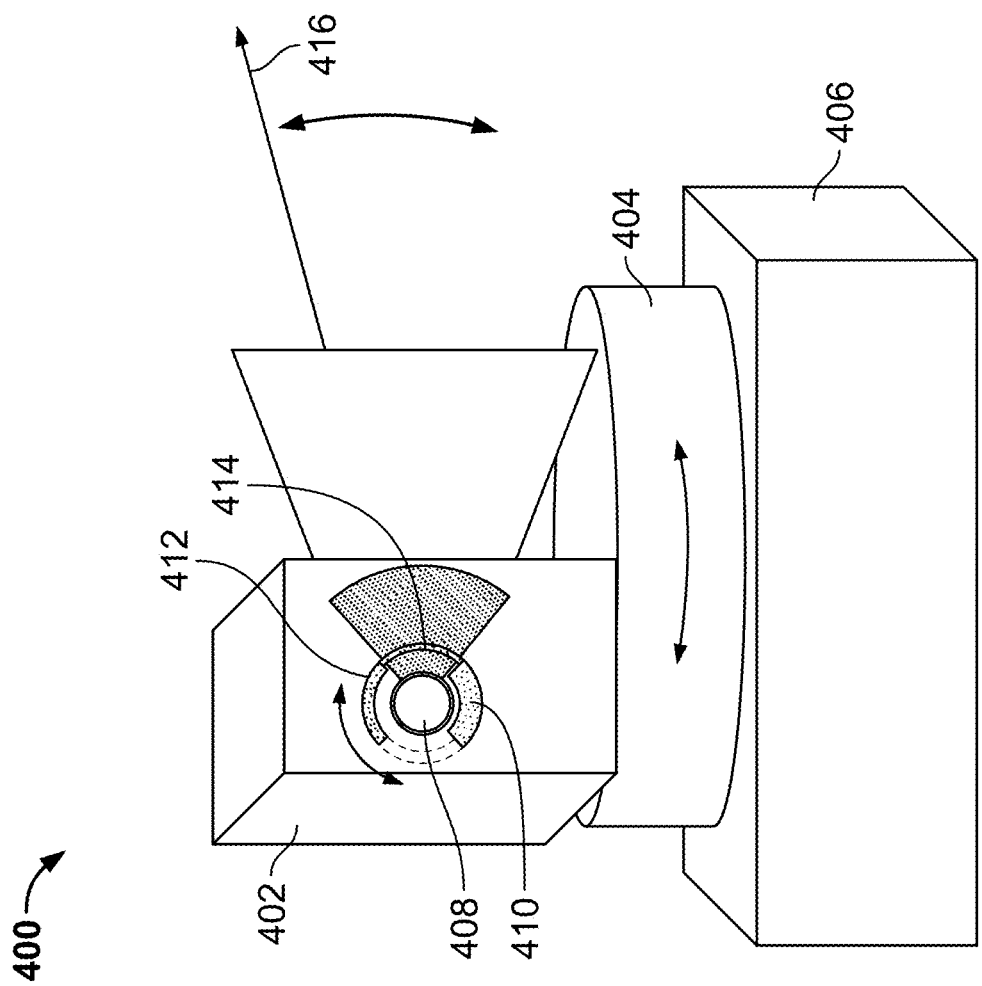
FIG. 4 is a diagram of an imaging module coupled with a turntable, in accordance with an embodiment of the present specification.

In an embodiment, the mechanical scan drive is replaced by a turntable carrying the imaging module of the inspection system, and rotating about a vertical axis, causing an X-ray fan beam to sweep horizontally over a target. FIG. 4 is a diagram of an imaging module coupled with a turntable, in accordance with an embodiment of the present specification. Inspection system 400 comprises an imaging module 402 fixedly placed upon a turntable 404, which, in turn, is supported by a base 406. Imaging module 402 comprises at least an X-ray source 408 coupled with a shutter 410 which can cover the source 408 if required. The shutter 410 is coupled with a first beam filter 412 and a second beam filter 414. The operation of the shutter 410 and the filters 412, 414 are the same as have been described above with respect to FIGS. 1A, 1B, 1C, and 1D. The turntable 404 may be rotated to position the imaging module 402 such that a filtered fan beam 416 of X rays is emitted in a desired direction. As shown in FIG. 4, the beam 416 scans in a vertical direction. In an embodiment, the variable beam filter of the present specification may be coordinated with the rotation speed of the turntable to obtain the same radiation quality as explained above.

The following United States Patent Numbers, describing, among other features, cargo scanning systems, which are commonly owned by Applicant or a parent company of Applicant, are herein incorporated by reference in their entirety: U.S. Pat. Nos. 6,542,580; 6,542,580; 6,658,087; 7,099,434; 7,218,704; 7,322,745; 7,369,643; 7,400,701; 7,486,768; 7,517,149; 7,519,148; 7,593,506; 7,720,195; 7,783,004; 7,817,776; 7,860,213; 7,876,880; 7,963,695; 7,991,113; 7,995,707; 7,995,705; 8,054,937; 8,059,781; 8,170,177; 8,194,822; 8,275,091; 8,345,819; 8,356,937; 8,385,501; 8,433,036; 8,437,448; 8,457,275; 8,503,605; 8,579,506; 8,644,453; 8,668,386; 8,687,765; 8,774,357; 8,781,067; 8,824,632; 8,837,670; 8,840,303; 8,903,046; 8,908,831; 8,929,509; 8,971,485; 9,020,096; 9,025,731; 9,036,779; 9,052,403; 9,052,264; 9,057,679; 9,121,958; 9,158,027; 9,223,049; 9,223,052; 9,274,065; 9,279,901; 9,285,498; 9,429,530; 9,541,540; 9,562,866; 9,632,205; 9,688,517; 9,791,590; 9,817,151; 9,823,201; 9,835,756; 9,958,569; 10,007,021; 10,007,019; 10,098,214; 10,228,487; 10,302,807; 10,317,566; 10,408,967; 10,422,919; 10,585,207; and 10,591,629.

In an embodiment where a system operator selects a range of beam filtration such that the dose output can vary by a specific factor (for example: 8× from minimum to maximum beam filtration), the controller may be configured to modulate the scan speed by the same factor (of 8×). If the controller determines that the maximum scan speed and minimum beam filter provide a SNR acceptable to the operator, then the controller may automatically determine that the minimum scan speed and maximum beam filter provides an identical dose and a similar SNR. In embodiments, a greater or lesser range for either beam filter or scan speed parameter may be adjusted, depending on use cases for the system. For example, in cases where there is no dose-to-cargo limitation, the minimum allowed scan speed may be arbitrarily low, and the ultimate dose arbitrarily high, even if, for mechanical reasons, it is not feasible to continue to add beam filter and exploit greater contrast at constant dose for the lowest scan speeds.

Mechanical Design of Variable Beam Filter

Referring back to FIG. 1A, in one embodiment, an X-ray tube is positioned behind each of the first filter 154 and second filter 156 relative to the object being scanned. Preferably, the first filter 154 comprises a curved surface that, relative to the X-ray tube 150 is concentrically positioned and movable through an arc to be alternatively positioned within, or not within, the field of view 167 of the X-ray tube 150. Similarly, the second filter 156 comprises a curved surface that, relative to the X-ray tube 150 is concentrically positioned and movable through an arc to be alternatively positioned within, or not within, the field of view 167 of the X-ray tube 150. The first filter 154 and the second filter 156 are also preferably concentrically positioned relative to each other so that they may be concurrently moved, through an arc, to be both concurrently within, or not within, the field of view 167 of the X-ray tube 150.

Figure 5A:
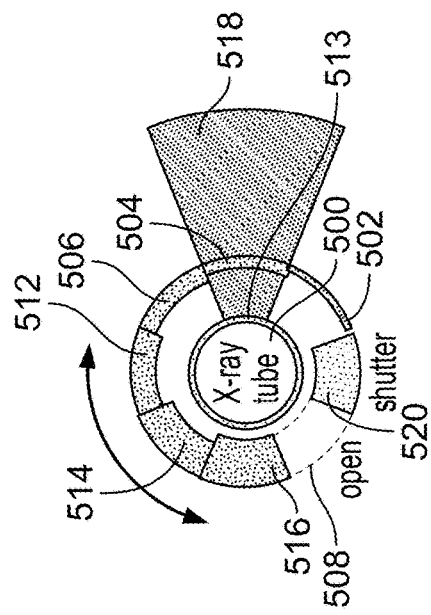
FIG. 5A is a diagram of an exemplary beam filtration system configuration for obtaining at least three beam spectra, in accordance with an embodiment of the present specification.

FIG. 5A is a diagram of an exemplary beam filtration system configuration for obtaining at least three beam spectra, in accordance with an embodiment of the present specification. As shown in FIG. 5A, filters 502, 504, and 506 of varying thickness are positioned radially or concentrically around a beam forming aperture 513 of an X-ray source 500, such that each filter occupies a portion of a circular arc around the source 500, in a rotating wheel configuration, wherein a portion 508 of the arc remains open. Three types of filtered beam spectra having a field of view 510 may be obtained by positioning each of the three filters 502, 504, and 506 (one by one) in front of the beam forming aperture 513. This configuration does not employ a shutter such as is shown in FIG. 1A. Due to the absence of the shutter, the open portion 508 of the arc may be occupied by any of the filters 502, 504, and 506 in such a manner as to allow the open portion 508 to be positioned in front of the beam forming aperture 513, in order to obtain a fourth unfiltered beam spectrum. For example, referring to FIG. 5A the unfiltered beam may be obtained by siding the filter 506 to the open portion 508 and the filter 504 to the position earlier occupied by the filter 506, thereby leaving the portion of the arc in front of the beam forming aperture 513 (earlier being occupied by the fitter 504) to be open. A spectral field of view that is approximately 90 degrees, is obtained by using the filter placement/configuration shown in FIG. 5A.

It should be appreciated that the described radially translated filter system defines a field of view, for each level of filtering, that is less than the angular extent of the filter, where the angular extent is defined by the angle formed by one end of the filter, the center of the X-ray source, and the other end of the filter, as shown by angle 192 in FIG. 1A with respect to filter #2. In one embodiment, the field of view is on the order of 0.5 degrees to 5 degrees less than the angular extent of the filter.

Figure 5B:
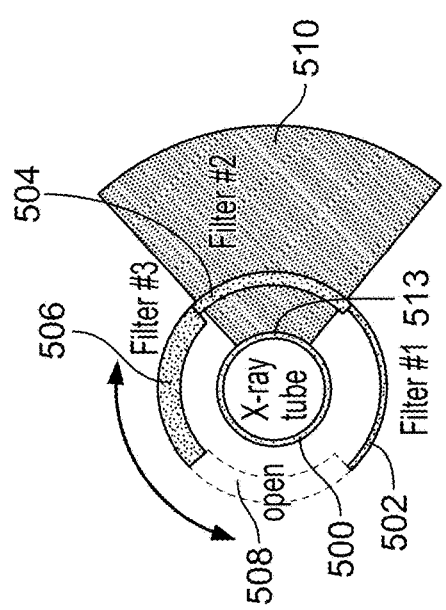
FIG. 5B is a diagram of an exemplary beam filtration system configuration for obtaining a plurality of beam spectra, in accordance with an embodiment of the present specification.

FIG. 5B is a diagram of an exemplary beam filtration system configuration for obtaining a plurality of beam spectra, in accordance with an embodiment of the present specification. As shown in FIG. 5B, by reducing the field of view 510 of the beam spectrum obtained in FIG. 5A, a plurality of filters along with a mechanical shutter may be employed in an arc around the source 500, for increasing the number of beam spectra obtainable using the system. In the embodiment shown in FIG. 5B, six filters 502, 504, 506, 512, 514, and 516 of varying thicknesses have been employed, enabling a system operator to obtain six different beam spectra having a field of view 518 corresponding to each of the filters. An open portion 508 of the arc when brought in front of the beam forming aperture 513 as explained with respect to FIG. 5A provides an unfiltered beam spectrum. A mechanical shutter 520 is also employed in the configuration shown in FIG. 5B. In various embodiments, the 'open' position provides a filtration of zero mm of any material (i.e. allows all components of the X-ray beam to pass through), while the shutter may be considered as providing infinite filtration (i.e. does not allow any component of the X-ray beam to pass through). Although only six filters are shown in FIG. 5B, it would be apparent to those skilled in the art that by reducing the field of view/increasing the distance of the ring of filters from the source, any number of filters may be employed.

Figure 5D:
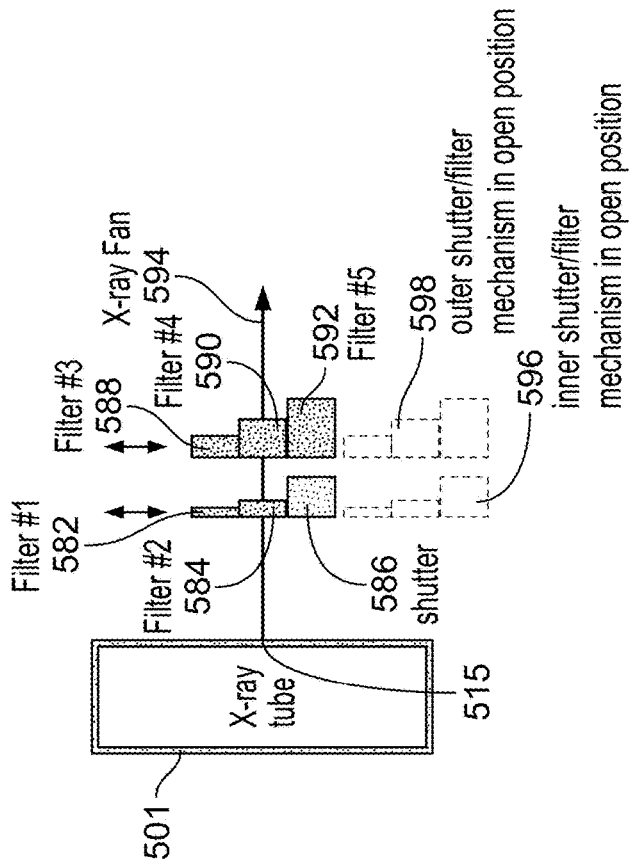
FIG. 5D is a diagram of a top view of an exemplary beam filtration system configuration employing multiple filters arranged linearly in front of a source for obtaining a plurality of beam spectra, in accordance with an embodiment of the present specification.
Figure 5C:
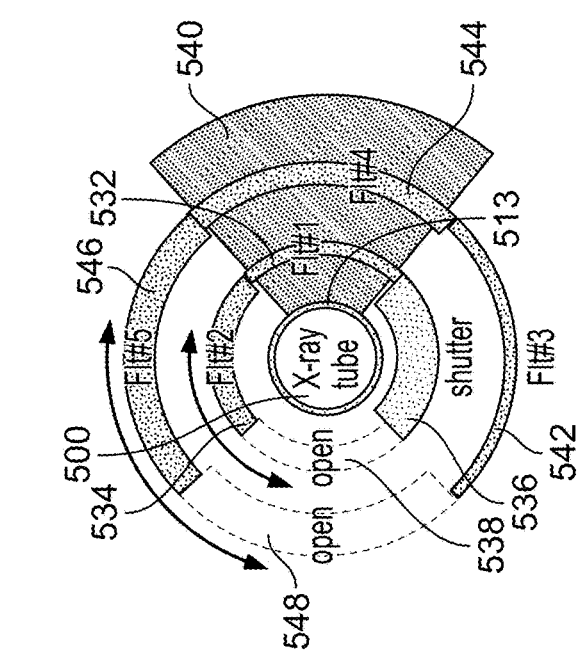
FIG. 5C is a diagram of an exemplary beam filtration system configuration employing multiple filter rings around an X-ray source for obtaining a plurality of beam spectra, in accordance with an embodiment of the present specification.

FIG. 5C is a diagram of an exemplary beam filtration system configuration employing multiple filter rings around an X-ray source for obtaining a plurality of beam spectra, in accordance with an embodiment of the present specification. Two concentric rings of filters have been positioned around the source 500 in the configuration shown in FIG. 5C. An inner ring comprises two filters 532, 534 of varying thickness, a shutter 536 and an open portion 538; while an outer ring comprises three filters 542, 544, 546 of varying thickness, and an open portion 548. A filtered beam 540 of different characteristics may be obtained by positioning various combinations of the five filters and two open portions in front of the beam forming aperture 513 of the source 500. In the exemplary filter combination shown in FIG. 5C, a beam spectrum 540 is obtained by placing the filters 532 (from the inner ring) and 544 (from the outer ring) in front of the beam forming aperture 513. In various embodiments, for a field of view of approximately 90 degrees, twelve filter combinations (including the combination where no filter is placed in front of the beam forming aperture 513, i.e. both the open portions 538, 548 are positioned in front of the beam forming aperture 513) are possible when the shutter 536 is employed in the configuration as shown in FIG. 5C. If the shutter 536 is not included a total of 16 combinations of filters would be available with the configuration of FIG. 5C. In various embodiments, the filters 532, 534 and 542, 544, 546 may be made of the same or different materials. In embodiments, where a filter having a first thickness in the outer ring is placed in front of a filter having a second thickness in the inner ring, and both the filters are made of the same material, the combined filtration effect would be the same as that of a single filter having a thickness which is the sum of the first and the second thicknesses.

FIG. 5D is a diagram of a top view of an exemplary beam filtration system configuration employing multiple filters arranged linearly in front of a beam forming aperture of a source for obtaining a plurality of beam spectra, in accordance with an embodiment of the present specification. As shown in FIG. 5D, filters 582, 584 and a shutter 586 are provided in a first vertical row in front of a source 501, and filters 588, 590 and 592 is provided in a second vertical row positioned in front of the first row of filters (582, 584). As explained with reference to FIG. 1C, filters 582, 584 and the shutter 586 as well as the filters 588, 590 and 592 shown in FIG. 5D may be translated vertically to position either one of the filters (or the shutter) in front of the beam forming aperture 515 of the source 501 to obtain a filtered beam 594. Dotted lines 596 depict the position of the filters 582, 584 and the shutter 586 in an open position i.e. not covering the beam forming aperture 515, and the dotted lines 598 depict the position of the filters 588, 590 and 592 in an open position. In embodiments, a large number of filters may be used in the design illustrated in FIG. 5D, as the angular field of view of the source places no limitation on the number of filters that can be positioned in front of the beam forming aperture 515. In various embodiments, when filters are employed in the concentric ring configuration, as explained with respect to FIGS. 5A-5C, the field of view of a filter placed in front of a pencil beam forming aperture of an X-ray source is approximately 2°-4° less than the angle of the filter. This is because in accordance with the known rules of mechanics and optics, a pencil beam has a finite width, and due to timing and data management, the field of view of a filter is less than 360/N, where N is an integer value. Hence, if the field of view is <360/N, N spectra may be obtained by using filter configurations as shown in FIGS. 5A-5C.

In an embodiment, an exemplary contrast beam filter that can produce high contrast images of organic threats and that can be used for enhancing visibility of objects near the edge of detectability such as discussed above is made of dense materials having high atomic numbers. More specifically, the contrast beam filter is made from metals such as but not limited to bronze, tin, tungsten, or a copper matrix embedded with tungsten particles. In an embodiment, where the filter is made of materials such as tungsten or lead having fluorescence energies high enough to be detected in backscatter detectors (e.g. 60 keV for tungsten, 75 keV for lead) the filter is designed to absorb substantially all of the fluorescence. In an embodiment, the filter is designed either from a composite material or as having a multi-layer design which employs a secondary shielding layer made of steel or copper to absorb the fluorescence from the lead or tungsten. In an embodiment, the secondary shielding layer thickness is designed to absorb a predefined fraction of the fluorescence. For example, a secondary shielding layer made of 0.5 mm thick copper sheet attenuates fluorescence from tungsten to one half of its initial value.

In an embodiment, the contrast beam filter of the present specification is employed in conjunction with a beam collimation system that is designed to prevent scatter from exiting the system without passing through the beam filter. This is because any Compton or Rayleigh scatter which evades the beam filter but still exits through the beam forming aperture forms a 'halo' around the primary X-ray pencil beam which in turn, degrades spatial resolution of the images obtained. FIG. 6A is a diagram of a contrast beam filter employed in an X-ray collimation system, in accordance with an embodiment of the present specification. FIG. 6B is a diagram of a contrast beam filter employed in an X-ray collimation system, in accordance with another embodiment of the present specification. The system shown in FIGS. 6A and 6B comprises a shutter 602 coupled with filters 604 for filtering an X-ray beam 606. The X-ray beam 606 is generated by using an X-ray tube 608 and a pencil beam forming aperture 610. The aperture 610 is provided on a hoop 612, mounted to a rotatable dish shaped structure 614 which allows space for the X-ray tube 608. As can be seen in FIG. 6A, the X-ray tube 608 is not positioned on the axis 616 of the rotating dish 614. A motor 618 enables rotation of the dish 614. In order to minimize unwanted scatter, the beam 606 is collimated to a fan beam by a second collimator 620 that fills the space between an X-ray tube housing 622 and a shield ring 624. An exit opening 626 of the X-ray tube housing 622 also contributes to fan beam collimation and is referred to as a first fan collimator 621. As shown in FIGS. 6A and 6B, the shutter 602 and variable beam filters 604 are located between the exit opening 626 and the collimator 620. The shutter 602 coupled with filters 604 may be slid to at least partially cover the exit opening 626 for attenuating the beam 606, as is explained with reference to FIGS. 1A-1D above.

The system shown in FIG. 6A, when in operation, provides radiation safety for both the personnel operating the system as well as for the personnel being scanned by the system. This is because all direct paths of the beam 606 from a focal spot 628 to aperture 610 pass through the filter 604. In the system shown in FIG. 6A, a thin filter is used which allows for the maximum number of filters to be employed in a given available space.

However, this system allows scattered radiation 630 to exit the system through the aperture 610 without being first attenuated by the filter 604. This scattered radiation 630 may not pose a problem for safety, as the scatter is a relatively small fraction of the total dose. Also, since the safety of the personnel around the system is dependent upon the total dose, by increasing beam filtration in proportion to the dose, the safety parameters may be met. However, even if the system is safe for people, the scan images produced by the system may not be contrast efficient (as explained above) due the scattered radiation 630. As shown in FIG. 6A, the scattered radiation 630 contributes to a halo around the primary beam envelope 606. When the primary beam 606 is attenuated by an added filter, this un-attenuated scatter 630 halo becomes proportionately more intense, causing further degradation of image efficiency. In addition to degrading spatial resolution, the scatter 630 halo causes degradation of all forms of contrast, as the halo contributes to a background fog in the scan image.

FIG. 6B illustrates the collimation system of FIG. 6A modified to produce high contrast scan images. As shown in FIG. 6B, the exit opening 626 of the X-ray tube housing 622 is narrowed, and the beam filters 604 are widened such that there is no direct path for beam 606 to exit the opening 626 without passing through the filter 604. Since, this causes a reduction in the direct beam 606 falling on the walls of the second fan collimator 620, the thickness of the collimator 620 may be reduced as there is less scatter to be shielded. Hence, the scatter in the system of FIG. 6B is reduced (and has not been shown in FIG. 6B) as compared to the system of FIG. 6A, causing the system of FIG. 6B to produce more efficient high contrast images.

Figure 6C:
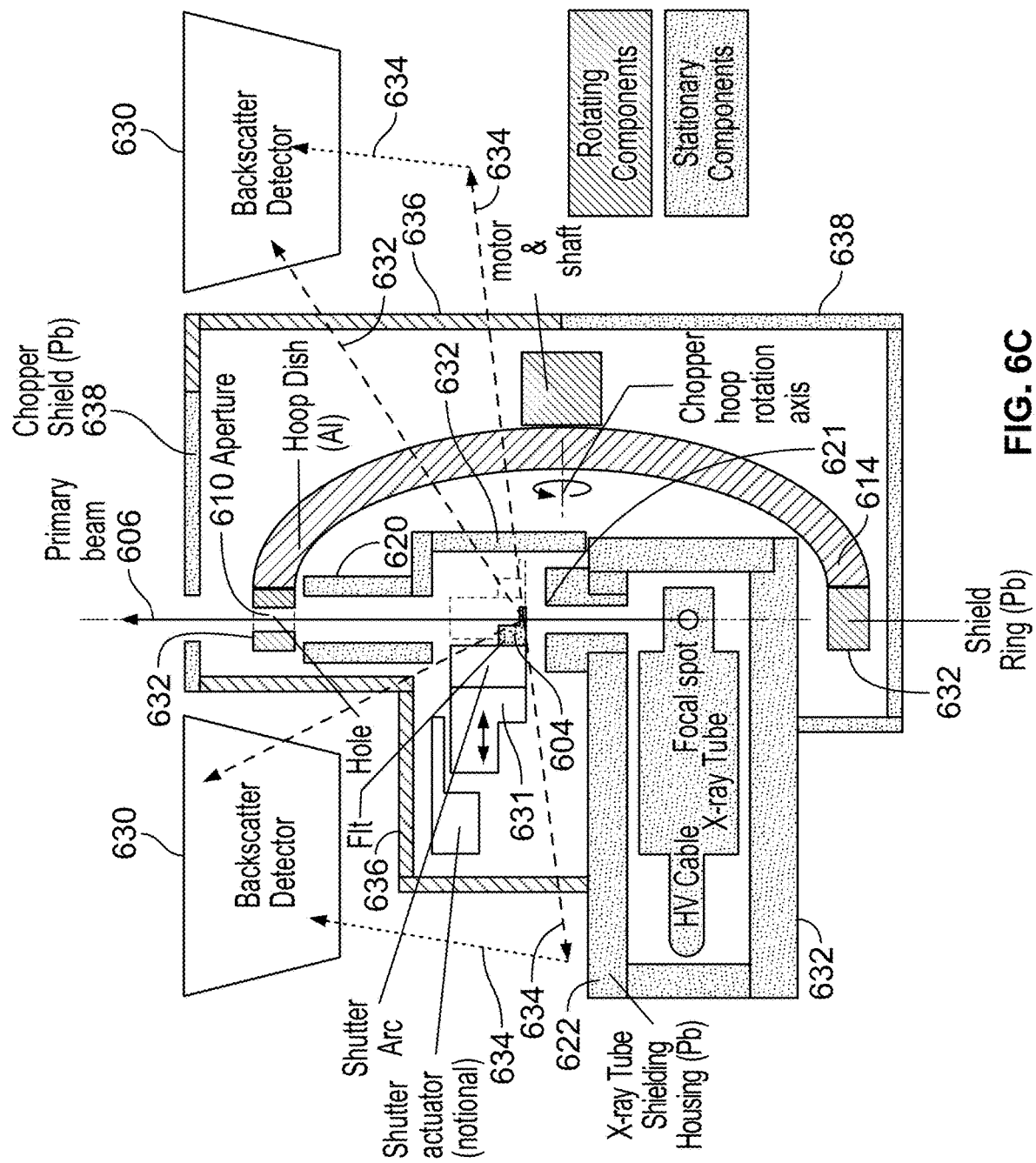
FIG. 6C illustrates scatter shielding employed in conjunction with the contrast beam filter inspection system shown in FIG. 6B, in accordance with another embodiment of the present specification.

In various embodiments, a scatter shielding used in conjunction with the filter of the present specification is designed to eliminate any signal noise/scatter. FIG. 6C illustrates scatter shielding employed in conjunction with the contrast beam filter inspection system shown in FIG. 6B, in accordance with another embodiment of the present specification. As shown in FIG. 6C backscatter detectors 630 may be employed in the system to detect radiation backscattered from an object being imaged. In various embodiments, the backscatter detectors 630 also inevitably detect radiation scattered by the filter 604 which is incorporated as part of a sliding/rotational filter changing system 631. A shielding 632 made of a material such as, but not limited to lead is provided around the X-ray tube housing 622 as well as the aperture 610. In various embodiments, additional shielding features are incorporated in the system to eliminate leakage around moving filter changer components 631 of the filter 604. Scatter paths such as 634 shown in FIG. 6C may be created due to scattering of the primary beam 606 by the filter 604 and/or the components of the filter changer hardware. Additional shielding 636 is provided around the system to eliminate leakage of X-rays along said scatter paths 634. Since, hardware components of the system such as the dish 614, which may be made of metals such as aluminum, or steel, do not provide required shielding, in an embodiment, additional shielding 638 made of lead or tungsten is provided around said components to prevent radiation leakage, as any leakage captured by the backscatter detectors would degrade the resultant scanned image quality.

In an embodiment, in order to prevent isotropic scatter originating from the beam filter from escaping the X-ray inspection system, the contrast beam filter when employed in an X-ray inspection system is located in close proximity to the X-ray source. The further a beam forming aperture of the beam collimation system of the X-ray inspection system is from the point of origin of this scatter (i.e. from the beam filter), the smaller is the solid angle of the aperture relative to the origin of the scatter, and the less scatter escapes the system. The same is true for any multiple scatter that finds a path around the beam filter. To maximize contrast by minimizing the effects of X-ray scatter, in one embodiment, the present system implements the beam filter as close as possible to the X-ray tube and as far as possible from the pencil beam forming aperture 610. The beam filter may be located either between the tube and the fan collimator, or due to space constraints, it may be between the fan collimator and the pencil beam forming aperture 610. As shown in FIG. 6, in one embodiment, the beam filter is positioned as close as possible to both the X-ray tube (608) and the first fan collimator (621) and as far as possible from the pencil beam aperture (610) to maximize contrast.

FIG. 7A is a top cross-sectional view diagram of a pencil beam collimation system employing a beam filter, in accordance with an embodiment of the present specification. FIG. 7B is a side cross-sectional view diagram of a pencil beam collimation system employing a filter, as shown in FIG. 7A. A single beam filter 702 is shown in FIGS. 7A, 7B for illustrative purpose, however the single filter 702 may be part of a plurality of beam filters employed in the rotational or translational beam filter changing systems described above. As shown, primary beam 704 emitted from X-ray tube 706 is attenuated by the filter 702 and collimated by a pencil beam forming collimator 708. Isotropic scatter 710 from the beam filter 702 constitutes a source of photons which can escape through an aperture 712 of the collimator 708. The scattered photons 710, collimated by the aperture 712, constitute a separate beam spot or 'halo' 714 around a beam spot 716 formed by the primary beam 704, as shown. The halo 714 degrades spatial resolution, as the scattered photons 710 sample a large area and effectively average the backscatter signal from that area, which is combined with the good image signal from the primary beam spot, the halo 714 reduces all forms of contrast in a scan image obtained via the system.

The intensity of the halo 714 signal (which is proportional to the flux of the scattered photons which escape through the aperture 712), is inversely proportional to the square of the distance (Lfilter) from the filter 702 to the aperture 712. The intensity of the primary beam 704 is inversely proportional to the square of the distance ($L_{fs}$) from a focal spot 718 of the X-ray tube 706 to the aperture 712. In various embodiments, the distance ($\Delta$) from a focal spot 718 of the X-ray tube 706 to the filter 702 is:

$$\Delta = L_{fs} - L_{filter} \quad \text{Equation 1}$$

The image degradation caused by the halo 714 is proportional to the ratio of bad flux from the scatter halo to good flux from the primary pencil beam 704 and may be defined as:

$$L_{fs}^2 / L_{filter}^2 = L_{fs}^2 / (L_{fs} - \Delta)^2 \quad \text{Equation 2}$$

Hence, a minimum halo 714 would be achieved with the beam filter 702 positioned in near contact with the X-ray tube 706. Also, if $\Delta$ grows from $0.1 \ast L_{fs}$ to $0.4 \ast L_{fs}$ then the scatter halo intensity will be increased by a factor of 2.25x; a further increase of 4 to $0.6 \ast L_{fs}$ increases halo intensity to 5.1x relative to a $\Delta$ of $0.1 \ast L_{fs}$. The effect of the halo 714 on spatial resolution is a function of both halo intensity and halo size, the latter factor being a function of a size of the aperture 712, distance of the aperture 712 from the focal spot 718, and the dimensions of the beam filter 702, which will be larger than the focal spot 718. These factors vary from one inspection system to another, but with a narrow primary beam 704 and narrow collimation aperture 712, and with the target distance $>10 \ast L_{fs}$, the ratio of the size of halo 714 (in one dimension) to primary beam spot 716 size is proportional to:

$$L_{fs}/L_{filter} = L_{fs}/(L_{fs} - \Delta) \quad \text{Equation 3}$$

Equation 3 is the square root of Equation 2. This relationship between Equations 2 and 3 shows that if $\Delta$ grows from $0.1 \ast L_{fs}$ to $0.4 \ast L_{fs}$ then the scatter halo diameter will be increased by a factor of 1.5x; and a further increase of 4 to $0.6 \ast L_{fs}$ increases halo diameter to 2.25x relative to a $\Delta$ of $0.1 \ast L_{fs}$.

In an embodiment, the contrast beam filter of the present specification is used in conjunction with a shielding that is designed to contain all scatter originating in the beam filter or related components, such that the scattered radiation does not escape the beam collimation system and does not enter one or more detectors of the X-ray inspection system. Escaped scattered radiation (leakage) contributes to a fog in the backscatter image obtained from the detectors, which reduces the image contrast. In a typical backscatter x-ray imaging system, the backscatter detectors are located near the X-ray source (rather than on the far side of the image target) and the detectors subtend a much larger area than typical transmission X-ray detectors. Backscatter detectors are sensitive to X-ray doses much smaller than those of concern for safety, and any leakage or scatter dose that enters the detectors contributes to a signal offset that degrades contrast. In order to enhance image contrast, the image SNR is compromised, thereby making it critical to eliminate all other sources of noise or unwanted signals. The scatter shielding used in conjunction with the filter of the present specification is thus designed to eliminate any signal noise/scatter, such as is described with reference to FIG. 6C. Hence, any leakage from every other part of the beam forming and collimation system of the X-ray inspection system such as but not limited to: direct leakage and scatter escaping the source housing; scatter escaping through gaps between the source housing and rotating chopper which forms the scanning pencil beam; and scatter through gaps that only exist to accommodate the mechanical structures which move the beam filter in and out of the beam is attenuated by using said shielding design.

Software Design of Variable Beam Filter

FIG. 8A depicts an exemplary graphical user interface for enabling an operator to adjust the contrast of an image, in accordance with an embodiment of the present specification. Referring to FIG. 8A, in one embodiment, a graphical user interface 801 has a display portion 804 and a plurality of controls 802, one of which may be a contrast level input mechanism, a scan speed input mechanism, and a signal to noise ration input mechanism, which may be an icon, button, toggle, switch, dialog box, or other input mechanism. In one embodiment, an operator may interface with the input mechanism 802 to increase or decrease the contrast level of generated images.

In one embodiment, the system may have an initial default contrast level that corresponds to a plurality of other default settings in the X-ray inspection system, including a default filter configuration. Upon modifying the contrast level, a controller 811 coupled with the X-ray inspection system, which is in data communication with the graphical user interface through a network 815, causes any default contrast settings in an X-ray inspection system to be reconfigured, including a position of the filters as described above and certain other software settings as described below, to accommodate the new contrast settings.

In embodiments, the controller 811 may modify any default settings for a minimum allowed user selectable scan speed for safety purposes, in order to limit the maximum dose per scan. In an embodiment, the controller 811 may modify any default settings for a maximum duty factor, in order to limit the amount of dose received by operators or bystanders.

In an embodiment, the controller 811 may prohibit scanning for a predefined period of time after a predefined scan time is reached along with modifying the maximum duty factor. For example, the system may be configured to emit X rays for 45 minutes in any period of 60 minutes. In embodiments, the time for which scanning is prohibited is different for each beam filter employed in the system; wherein the time for which scanning is prohibited is proportionate to dose, and is calculated as a function of time and beam filter. This enables a user to operate the system for part of an hour with one filter and remaining part of the hour with a different filter with the controller 811 taking into account the combined dose for the hour in order to determine when a scan prohibition is to be applied.

Figure 8B:
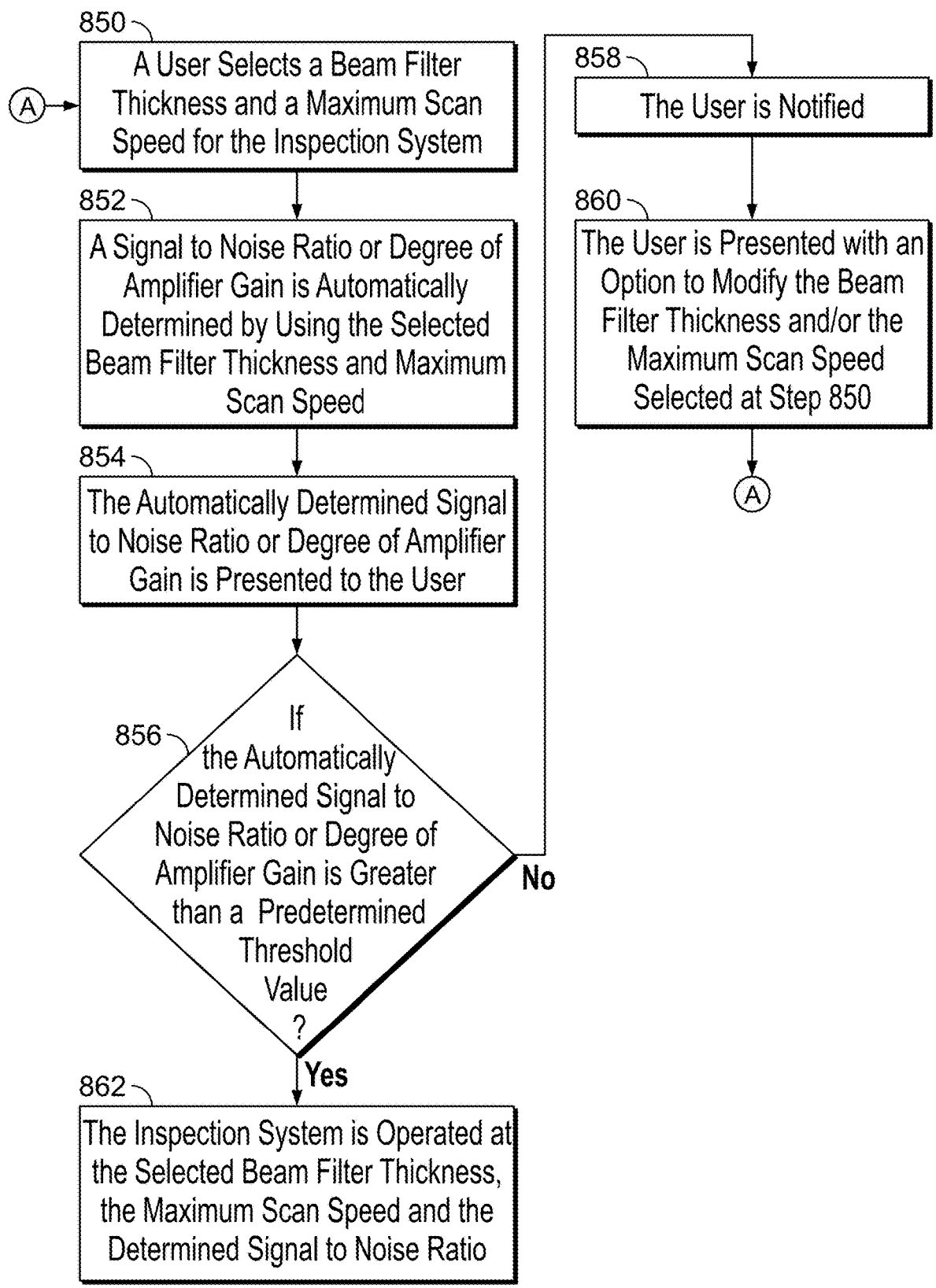
FIG. 8B is a flowchart illustrating a method for automatically determining a signal-to-noise ratio in response to a user selection of a beam filter thickness and a scan speed for the inspection system, in accordance with an embodiment of the present specification.

In an embodiment, controller 811 automatically determines one of: a beam filter thickness, a scan speed, and a signal to noise ratio, in response to a user selecting at least two of said parameters. FIG. 8B is a flowchart illustrating a method for automatically determining a signal-to-noise ratio in response to a user selection of beam filter thickness and scan speed for the inspection system, in accordance with an embodiment of the present specification. At step 850, a user selects a beam filter thickness and a maximum scan speed for the inspection system. In embodiments, as explained above, the contrast of a scan image is dependent upon the beam filter thickness selected. In embodiments, a heavy filter may result in a high contrast scan image.

FIG. 8E is an exemplary table illustrating the correlation among beam filter thickness, scan speed, and signal to noise ratio values, in accordance with an embodiment of the present specification. Table 840 comprises a column 842 listing a plurality of beam filters, a column 844 listing a plurality of corresponding scan speeds and a column 846 listing a plurality of SNR values relative to a baseline system that includes a 1 mm copper filter and operates at a 1 km/h scan speed, with variable parameters that include, but are not limited to, scan distance and detector array size. For example, the user may select 1) a 2 mm thick copper beam filter in order to obtain a maximum penetration contrast and 2) a maximum scan speed of 10 km/h in order to allow rapid inspections of a queue of vehicles. Referring to the table 840, the controller (811 in FIG. 8A) automatically determines that the SNR value may drop as low as 0.26 times the baseline configuration value shown in column 846. In an embodiment, a predefined threshold value of SNR may set the SNR to fall no lower than 0.32 times the baseline value (corresponding to one tenth of a baseline flux). In such embodiments, the user is notified that selected beam thickness and scan speed would provide an extremely low SNR value that falls below the predefined threshold value. In an embodiment, the controller may prompt the user to limit the scan speed to 3 km/h for use with the 2.0 mm copper filter (or to a scan speed ranging between 3 km/h and 10 km/h). In an embodiment, the controller may prompt the user to limit the beam filter thickness to 1 mm copper with a scan speed of 10 km/h.

Referring back to FIG. 8B, at step 852, a signal to noise ratio or degree of amplifier gain is automatically determined by using the selected beam filter thickness and maximum scan speed. In an embodiment, the controller 811 is programmed to determine the signal to noise ratio by using the user selected beam filter thickness and maximum scan speed. At step 854, the automatically determined signal to noise ratio or degree of amplifier gain is presented to the user via the graphical user interface 801. At step 856, it is determined if the automatically determined signal to noise ratio or degree of amplifier gain is greater than a predetermined threshold value, wherein the threshold value is a baseline value indicative of a minimum level of acceptable signal to noise ratio or degree of amplifier gain. If the signal to noise ratio or degree of amplifier gain is less than the predetermined threshold value, the user is notified of the same at step 858. At step 860, the user is presented with an option to modify the beam filter thickness and/or the maximum scan speed selected at step 850. In an embodiment the user can modify the beam filter thickness and/or the maximum scan speed selected by using the graphical user interface 801 and the plurality of controls 802. At step 862, if the signal to noise ratio or degree of amplifier gain is greater than the predetermined threshold value, the user is notified of the same and the inspection system is operated at the selected beam filter thickness, the maximum scan speed and the determined signal to noise ratio or degree of amplifier gain.

Figure 8C:
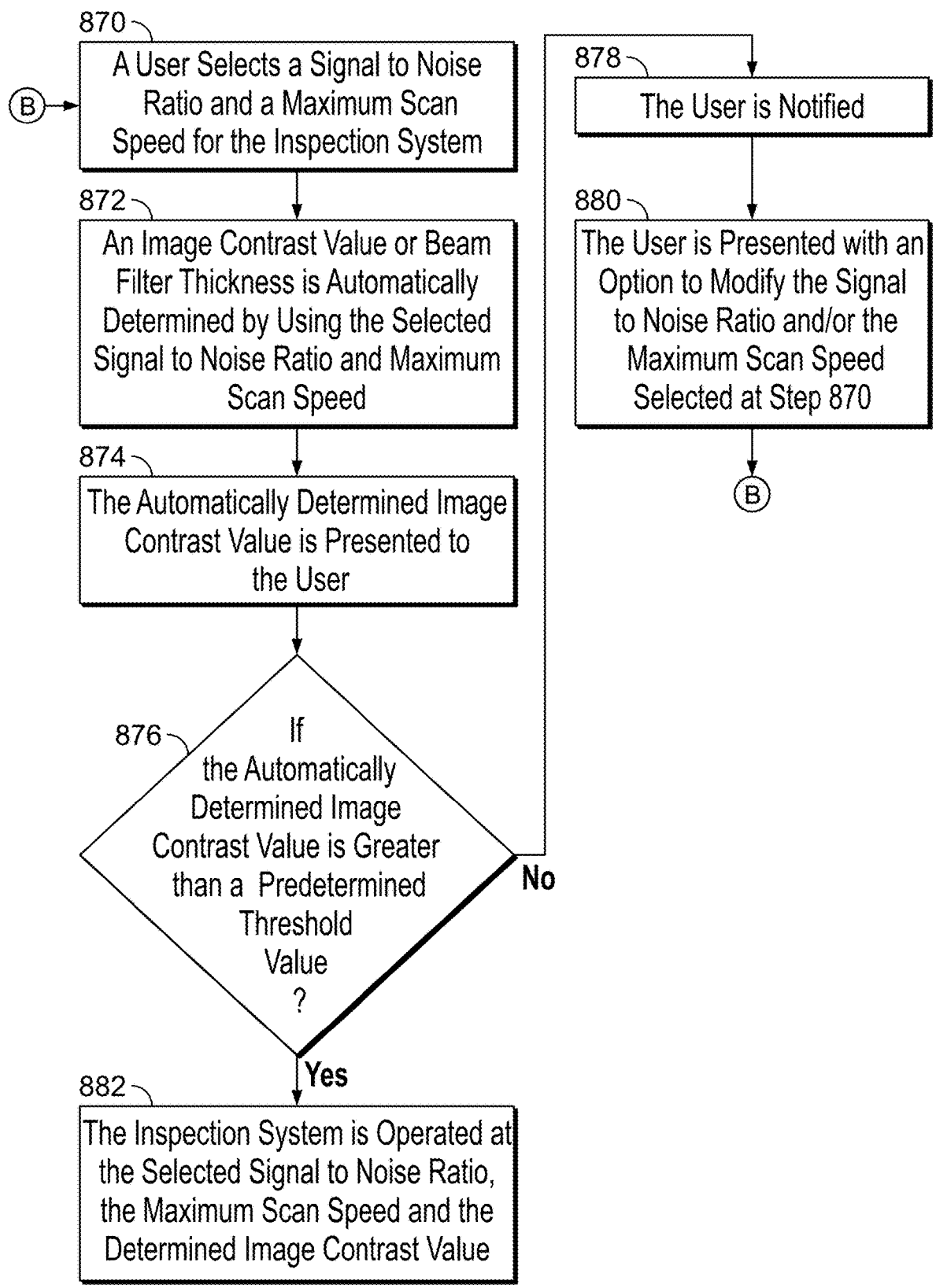
FIG. 8C is a flowchart illustrating a method for automatically determining an image contrast value in response to a user selection of a signal-to-noise ratio and scan speed for the inspection system, in accordance with an embodiment of the present specification.

FIG. 8C is a flowchart illustrating a method for automatically determining an image contrast value in response to a user selection of a signal to noise ratio and a scan speed for the inspection system, in accordance with an embodiment of the present specification. At step 870, a user selects a signal to noise ratio and a maximum scan speed for the inspection system. In embodiments, as explained above, the contrast of a scan image is dependent upon the beam filter thickness selected. In embodiments, a heavy filter would result in a high contrast scan image. For example, the user may select a high SNR value, such as 1.4 times that of the typical baseline value, for the purpose of obtaining smooth clear images, and a maximum scan speed of 1 km/h, for moderate speed inspection of a small number of vehicles. Then, referring to the table 840 shown in FIG. 8E, the controller (811 in FIG. 8A) automatically provides that the only compatible available beam filter thickness is the 0.8 mm beryllium beam window (effectively zero beam filtration) which will provide modest penetration contrast (lower than the typical baseline value). Based on the purpose of the scanning system, in an embodiment, a predefined threshold value for penetration contrast may be defined. For example, a scanning system operated by the military may need to detect organic IEDs in the trunks of cars. In such an embodiment, the controller may prompt the user to select a heavier beam filter, such as a copper filter having 1.0 mm thickness. As shown in FIG. 8E, the scan speed of 1 km/h shown in column 842 corresponds to a SNR value of 1.45x shown in column 846, which is higher than the desired SNR with the 1 mm Copper filter. In an embodiment, the controller determines a lower scan speed (e.g. 0.5 km/h) if the scanning system is capable of providing such a speed. If the scanning system is not capable of providing such a low speed, the user would be prompted to select a lower SNR value.

At step 872, an image contrast value or beam filter thickness is automatically determined by using the selected signal to noise ratio and maximum scan speed. In an embodiment, the controller 811 is programmed to determine the image contrast value by using the user selected signal to noise ratio and maximum scan speed. At step 874, the automatically determined image contrast value is presented to the user via the graphical user interface 801. At step 876, it is determined if the automatically determined image contrast value is greater than a predetermined threshold value, wherein the threshold value is a baseline value indicative of a minimum level of acceptable image contrast value. If the image contrast value is less than the predetermined threshold value, the user is notified of the same at step 878. At step 880, the user is presented with an option to modify the signal to noise ratio and/or the maximum scan speed selected at step 870. In an embodiment the user can modify the signal to noise ratio and/or the maximum scan speed selected by using the graphical user interface 801 and the plurality of controls 802. At step 882, if the image contrast value is greater than the predetermined threshold value, the user is notified of the same and the inspection system is operated at the selected signal to noise ratio, the maximum scan speed and the determined image contrast value.

Figure 8D:
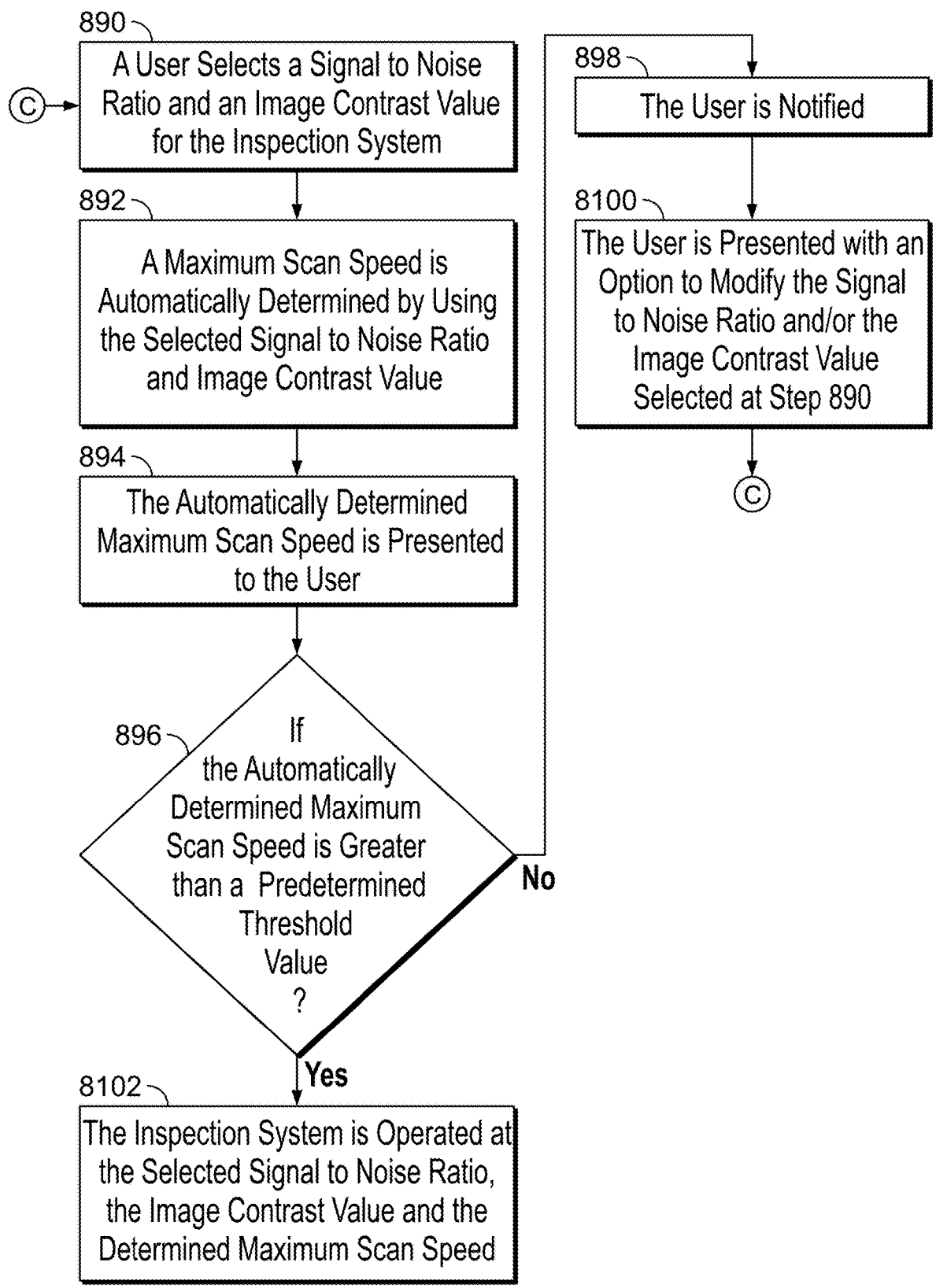
FIG. 8D is a flowchart illustrating a method for automatically determining a maximum scan speed in response to a user selection of a signal-to-noise ratio and an image contrast value for the inspection system, in accordance with an embodiment of the present specification.

FIG. 8D is a flowchart illustrating a method for automatically determining a maximum scan speed in response to a user selection of signal to noise ratio and image contrast value for the inspection system, in accordance with an embodiment of the present specification. At step 890, a user selects a signal to noise ratio and an image contrast value for the inspection system. In embodiments, as explained above, the contrast of a scan image is dependent upon the beam filter thickness selected. In an embodiment, a heavy filter would result in a high contrast scan image. For example, the user may select an SNR value which is 0.8 times a typical baseline value, in order to obtain images roughly comparable to those with a typical level of image grain, and a high penetration contrast value, to maximize the ease and efficacy of detecting organic anomalies such illicit drugs hidden behind the body panels of vehicles. Then, referring to the table 840 shown in FIG. 8E, the controller (811 in FIG. 8A) automatically determines the ideal beam filter as the copper filter having a thickness of 2.0 mm, and the maximum compatible scan speed as 1 km/h. In an embodiment, where, based on the requirement of the user a maximum scan speed of 3 km/h has been predefined, in order to ensure a moderately high scan throughput, the controller prompts the user to either select a lower SNR value (such as 0.48x the typical baseline value), or a lower level of penetration contrast.

At step 892, a maximum scan speed is automatically determined by using the selected signal to noise ratio and image contrast value. In an embodiment, the controller 811 is programmed to determine the maximum scan speed by using the user selected signal to noise ratio and image contrast value. At step 894, the automatically determined maximum scan speed is presented to the user via the graphical user interface 801. At step 896, it is determined if the automatically determined maximum scan speed is greater than a predetermined threshold value, wherein the threshold value is a baseline value indicative of a minimum level of acceptable maximum scan speed. If the maximum scan speed is less than the predetermined threshold value, the user is notified of the same at step 898. At step 8100, the user is presented with an option to modify the signal to noise ratio and/or the image contrast value selected at step 890. In an embodiment, the user can modify the signal to noise ratio and/or image contrast value selected by using the graphical user interface 801 and the plurality of controls 802. At step 8102, if the maximum scan speed is greater than the predetermined threshold value, the user is notified of the same and the inspection system is operated at the selected signal to noise ratio, the image contrast value and the determined maximum scan speed.

In various embodiments, nonlinear transfer functions used such as 'Gamma' and 'S-Curve' transfer functions, may have to be configured upon selecting a different contrast level since the ideal gamma or S-curve transfer functions are dependent on the proportion of bright/dark pixels in an image. In embodiments where only one beam filter is used, only one set of parameters is required for applying the transfer functions, whereas where 'n' number of beam filters are used, 'n' set of parameters (i.e. one set of parameters for each filter) are required. In embodiments, a Gamma function is defined by one parameter, while a S-Curve is defined by using a plurality of parameters. Choice of Gamma or S-Curve transfer function is based on a required characteristic or 'look' of the scanned image.

In embodiments, a processing unit of the inspection system employing the contrast motivated beam filter system, receives data representative of an image and from a detector array implements a S-curve transfer function in order to suppress unaesthetic fog and/or noise in dark background regions of backscatter radiation images. Operationally, the controller accesses a memory storing a plurality of parameters specific to each filter. For example, if there are N beam filters, then the memory preferably stores, and the controller preferably has access to, N sets of corresponding parameters, wherein each set of corresponding parameters define at least one of the above described Gamma function or S-Curve transfer function. The plurality of parameters are pre-selected depending on a desired aesthetic look for a given filter type. For a backscatter radiation image, where different detected materials correspond to changes in signal level, such transfer functions should be reconfigured based on the new level of contrast. The addition of the beam filter of the present specification both elevates the signal in the air regions and adds noise (due to the reduced flux) increasing both the need for a modified S-curve transfer function and increasing the need to carefully optimize the shape of the S-curve for the particular imaging scenario.

Figure 9A:
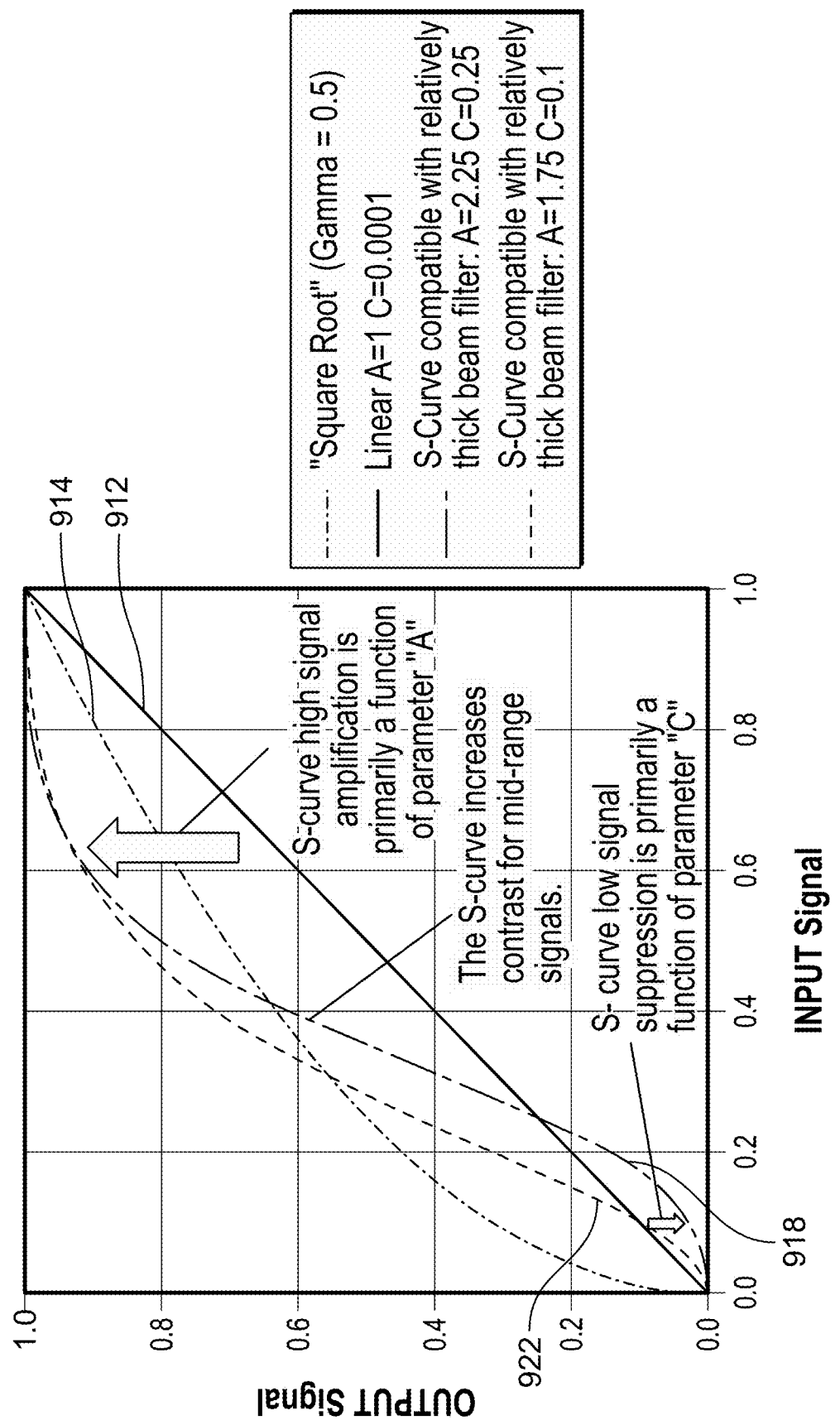
FIG. 9A is a graph showing transfer functions that may be used for processing a backscatter X-ray image, in accordance with an embodiment of the present specification.

FIG. 9A is a graph showing transfer functions that may be used for processing a backscatter X-ray image, in accordance with an embodiment of the present specification. FIG. 9B is a backscatter image processed by using a linear function, in accordance with an embodiment of the present specification. FIG. 9C illustrates the backscatter image of FIG. 9B processed by using a Gamma transfer function, in accordance with an embodiment of the present specification. FIG. 9D illustrates the backscatter image of FIG. 9B processed by using a S-Curve transfer function, in accordance with an embodiment of the present specification. Referring to FIGS. 9A-9D, the shape of S-Curves 918, 922 is a function of parameters 'A', and 'C', where parameter A dominates the mid-high signal amplification and parameter C dominates low signal suppression. Referring to FIGS. 9A, and 9B, image 910 is obtained by using a 1.0 mm thick copper beam filter wherein only a linear function depicted by plot 912 corresponding to a value of A being 1 and C being 0.0001 is applied, so the image 910 represents raw scan data which has not been processed. Referring to FIGS. 9A, and 9C when the image 910 is processed by using a gamma function such as 'square root filter' depicted by plot 914, image 916 is obtained. As can be seen by comparing FIGS. 9B and 9C, the image 916 has increased brightness and relative contrast for darker regions, in trade for reduced contrast in the brighter regions as compared with the original image 910. Referring to FIGS. 9A, and 9D when the image 910 is processed by using an S-Curve function depicted by plot 918 corresponding to a value of A being 2.25 and C being 0.25, image 920 is obtained. The S-Curve of plot 918 is compatible with relatively thick beam filter usage and may be applied to images obtained by using thick filters to darken any foggy background regions in the image. As can be seen in FIG. 9A, the S-Curve of plot 918 has a steeper slope in the mid-range of the input signal, providing more contrast in this range, and a shallower slope in the low range of the input signal, proving more low signal suppression. As can be seen by comparing FIGS. 9B, 9C and 9D, the image 920 has reduced fog 915 and enhanced mid high signal organic threats 917 as compared with the original image 910 and gamma function processed image 916. Referring to FIG. 9A plot 922 depicts an S-curve corresponding to a value of A being 1.75 and C being 0.1. The S-Curve of plot 922 is compatible with relatively thin beam filter usage and may be applied to images obtained by using thin filters to brighten mid-high signal regions such as for example, organic threat simulants hidden behind steel.

In various embodiments a plurality of contrast enhancement algorithms are developed for processing the images obtained with the use of minimal beam-filtration as described above, due to reduced contrast in the images. In various embodiments a plurality of edge enhancement algorithms are developed for processing the images obtained with the use of increased beam-filtration as described above. In some embodiments, contrast enhancement is achieved by employing methods such as, but not limited to, histogram stretch, or adaptive contrast by using adaptive histogram equalization, and/or contrast limited adaptive histogram equalization. In embodiments, image edges are enhanced by using methods such as, but not limited to 'Unsharp Masking' or a Sobel filter, combined with noise reduction achieved by using a non-local means filter.

Figure 10:
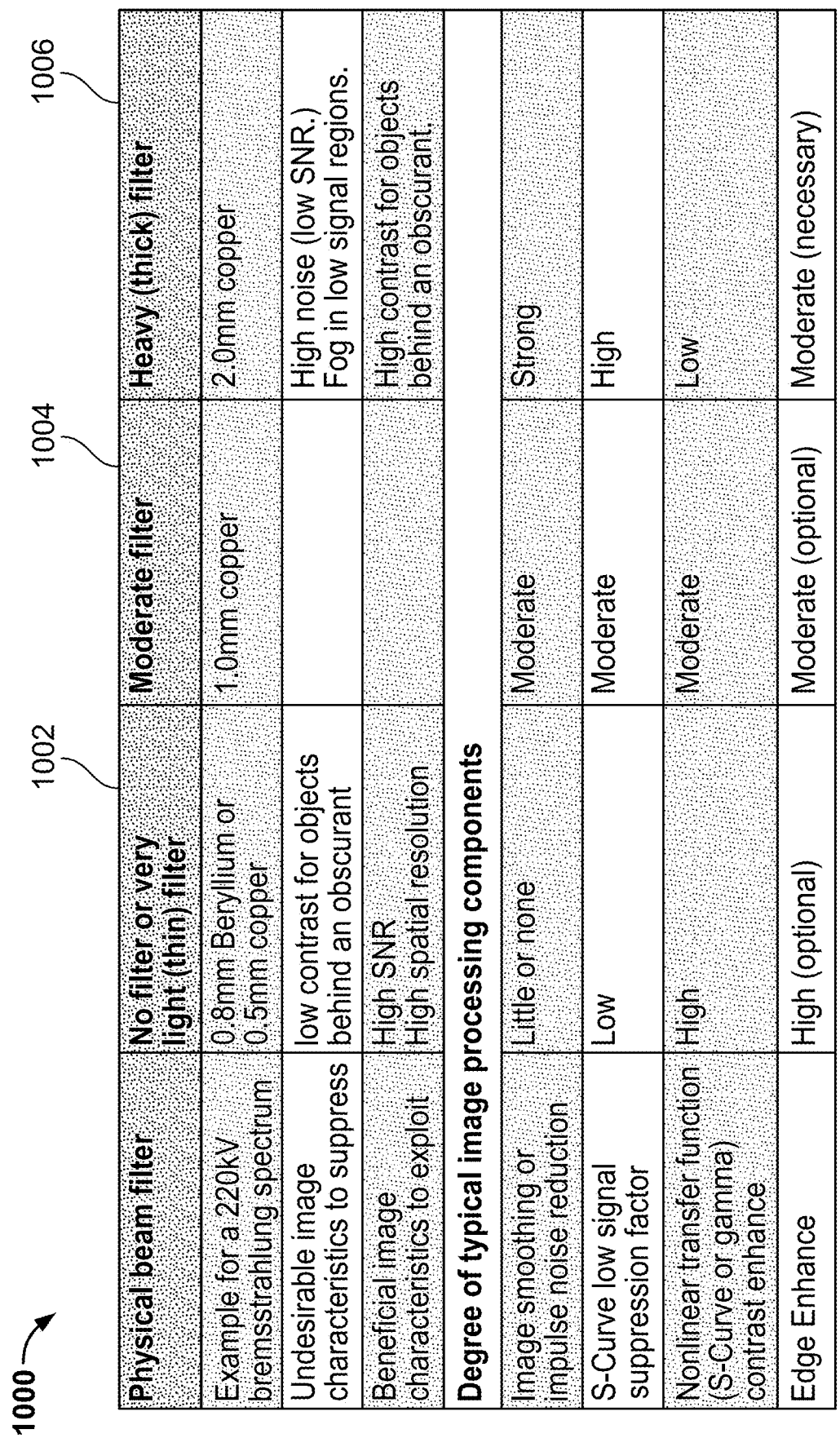
FIG. 10 is a table showing filter chains for different beam filter configurations that may be employed with the variable filter system, in accordance with an embodiment of the present specification.

In various embodiments, both backscatter and transmission X-ray images are typically processed by a chain of software image enhancement filters prior to display, wherein the filters have an associated 'strength' or degree to which each filter acts on an image. In some embodiments, filters are defined by multiple parameters which adjust the degree of different factors within the filter. In various embodiments, the choice of filters and the degree to which the chosen filters are combined before application to an image for processing the image is unique to each given system. FIG. 10 is a table showing filter chains for different beam filter configurations that may be employed with the variable filter system, in accordance with an embodiment of the present specification. Columns 1002, 1004 and 1006 of table 1000 provide characteristics of image processing obtained by using no (or very thin) filter, a moderate filter and a thick filter respectively. As shown in table 1000, for an exemplary 220 KV bremsstrahlung spectrum, a 0.8 mm thick Beryllium or 0.5 mm thick copper filter would correspond to no (or very thin) filter, a 1.0 mm copper filter to a moderate filter and a 2.0 mm copper filter to a thick filter. The use of no (or very thin) filter would provide a high SNR and high spatial resolution but a low contrast for any objects placed behind an obscurant in a processed image, while the use of thick filter would provide a high contrast for any objects placed behind an obscurant but a low SNR resulting in fog in low signal regions of the processed image. The use of no filter (column 1002) provides little or no image smoothening, low S-curve signal suppression factor, high non-linear transfer function contrast enhancement, and if needed a high edge enhancement in a processed image. The use of moderate filter (column 1004) provides moderate image smoothening, S-curve signal suppression factor, and non-linear transfer function contrast enhancement, and if needed a moderate edge enhancement in a processed image. The use of thick filter (column 1006) provides strong image smoothening, high S-curve signal suppression factor, low non-linear transfer function contrast enhancement, and a moderate edge enhancement in a processed image.

In various embodiments, X-ray inspection systems employing two or more of the contrast variable filters of the present specification comprise a corresponding number of default display parameters, which are automatically selected corresponding to a selection of beam filter.

In various embodiments, after a scanned image has been processed by using one or more beam filters, a user may perform image adjustments, such as, but not limited to 'histogram stretch' which is well known in the art and which can be compared with a user adjusting brightness and contrast on a cathode ray tube (CRT) television set. This type of image adjustment does not change any physical properties of the image as is done by the beam filters. The user image adjustment only leads to brightness and contrast adjustment of final display parameters of the image and represents only a linear scaling of the available image data.

Figure 11:
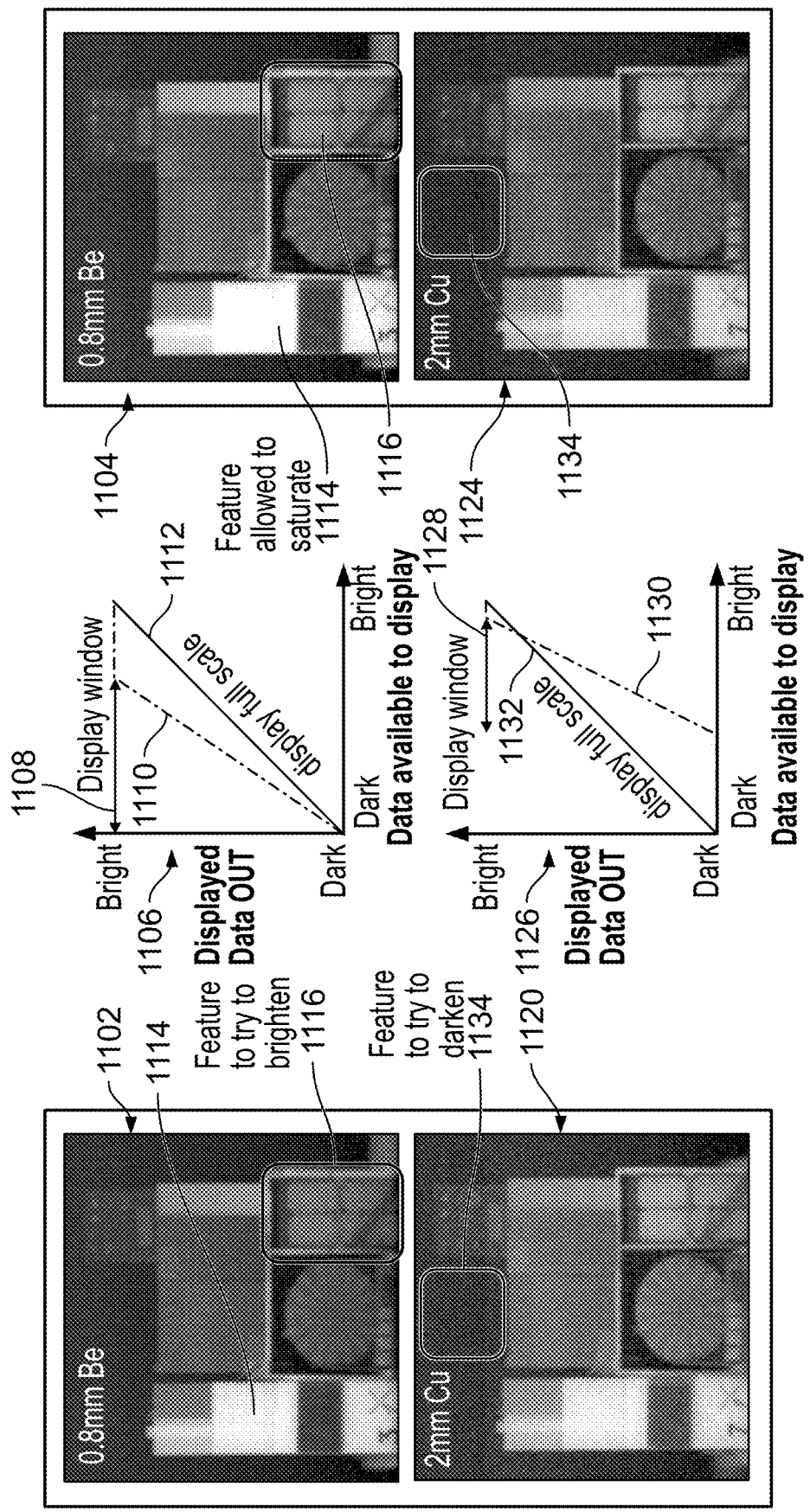
FIG. 11 illustrates image display adjustments made to scan images that have been processed by using one or more beam filters, in accordance with an embodiment of the present specification.

FIG. 11 illustrates image display adjustments made to scan images that have been processed by using one or more beam filters, in accordance with an embodiment of the present specification. Image 1102 has been processed by using a thin (0.8 mm) Be beam filter. Image adjustment such as, but not limited to 'histogram stretch' is applied on image 1102 in order to obtain image 1104. The image adjustment applied to image 1102 is depicted in graph 1106. As described above, a thin filter requires a greater brightness of mid-range signals as compared to a thick or moderate filter, so as depicted in graph 1106, a default display window depicted by plot 1108 is set to allow the brightest pixels to saturate as depicted by plot 1110, with respect to a full scale display depicted by plot 1112, in trade for making the rest of the pixels appear brighter. Plot 1108 depicts the region between high and low signal limits of the displayed data and is referred to as the display window. As can be seen upon comparing the image 1102 with the image 1104, feature 1114 is saturated and feature 1116 has been brightened in the image 1104.

Image 1120 has been processed by using a thick (2 mm) Cu beam filter. Image adjustment such as, but not limited to 'histogram stretch' is applied on image 1120 in order to obtain image 1124. The image adjustment applied to image 1120 is depicted in graph 1126. As described above, even after processing with a thick filter, the resultant image may still have unaesthetic noise or fog in the background, and so as depicted in graph 1126, a default display window depicted by plot 1128 is set to allow low signal data to be "clipped" as depicted by plot 1130 for the initial display. Plot 1128 depicts the region between high and low signal limits of the displayed data and is referred to as the display window. Since clipping the low signal data may make the overall image appear darker, a small fraction of the brightest pixels may be allowed to saturate as shown in graph 1126, in order to boost overall image brightness, such that in the bright regions, the average bright level is approximately similar to that of the full-scale display 1132. As can be seen upon comparing the image 1120 with the image 1124, feature 1134 has been darkened in the image 1124.

Figure 12:
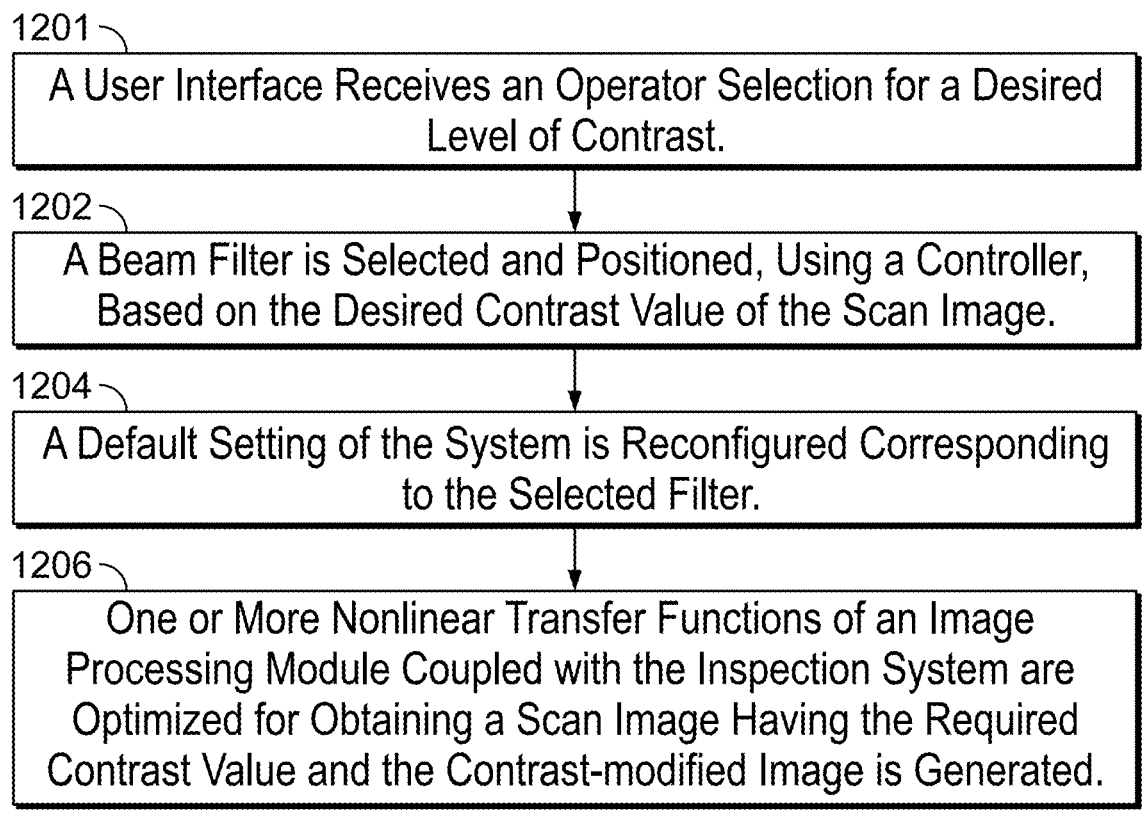
FIG. 12 is a flowchart illustrating a method of controlling a contrast value of a scan image obtained from a backscatter X-ray inspection system, in accordance with an embodiment of the present specification.

FIG. 12 is a flowchart illustrating a method of controlling a contrast value of a scan image obtained from a backscatter X-ray inspection system, in accordance with an embodiment of the present specification. The system comprises a plurality of beam filters of increasing thickness coupled with an X-ray source for filtering an X-ray beam produced by the X-ray source before the beam irradiates the object. At step 1202 a beam filter for filtering the X-ray beam is selected based on a default contrast setting or based on an operator-inputted desired level of contrast. The contrast selection is based on a desired contrast value of the scan image and it should be appreciated that an increase in contrast value is directly proportional to an increase in the thickness of a filter.

At step 1204 a default setting of the system is reconfigured corresponding to the selected filter. The reconfiguration of default settings enables the system to accommodate any changes that would occur in the scan image corresponding to changing beam filters. At step 1206 one or more nonlinear transfer functions of an image processing module coupled with the inspection system are optimized for obtaining a scan image having the required contrast value. In an embodiment, the obtained scan image is processed by using at least one of a contrast enhancement algorithm or an edge enhancement algorithm based on the required contrast value and a required SNR value of the image.

Figure 13:
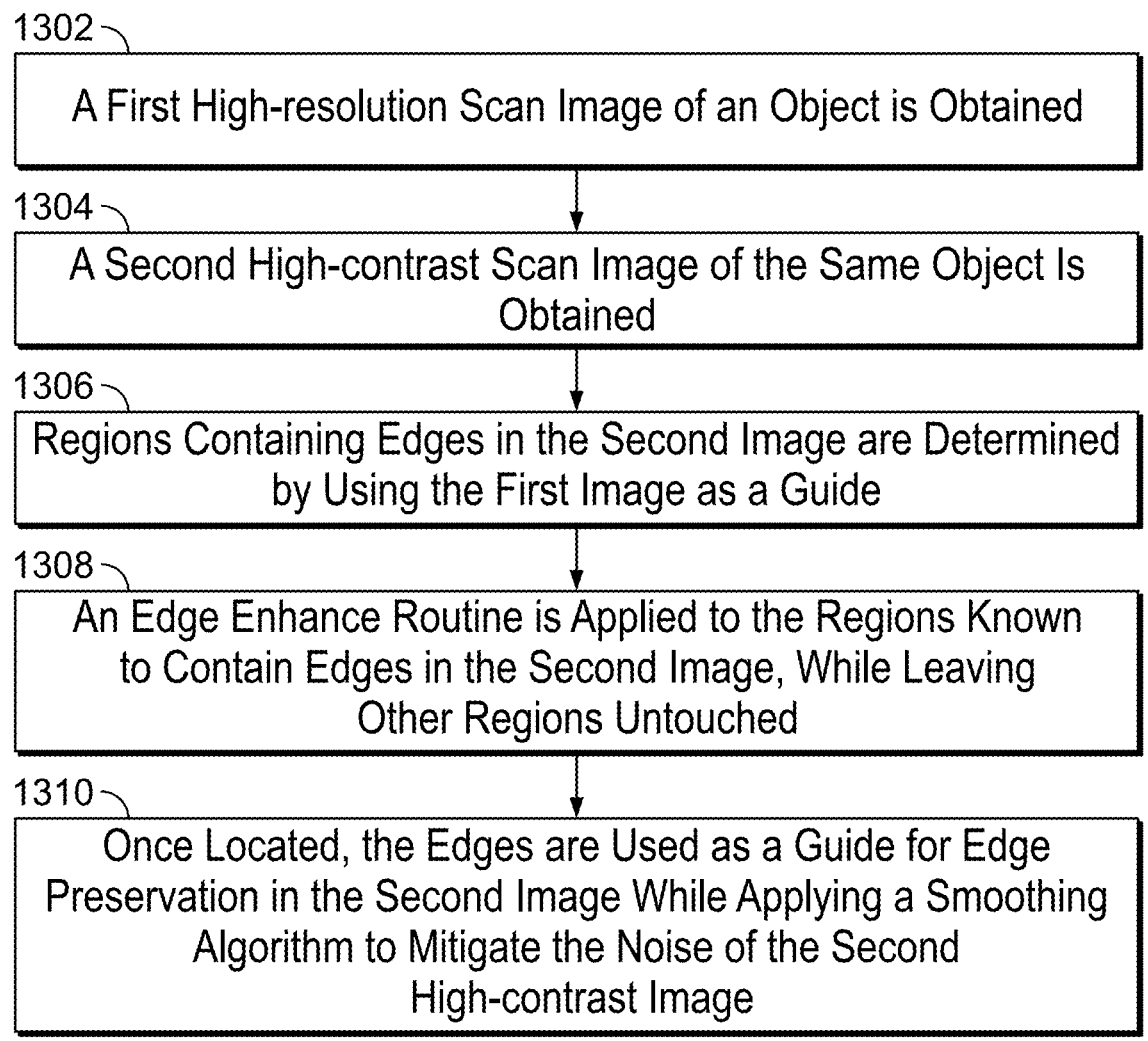
FIG. 13 is a flowchart illustrating a method of combining scan images to obtain an image having an improved detection quality, in accordance with an embodiment of the present specification.

In various embodiments, information from two images of a same target, wherein each image is obtained by using a different thickness of beam filter, may be combined to obtain an image having an improved detection quality. FIG. 13 is a flowchart illustrating a method of combining scan images to obtain an image having an improved detection quality, in accordance with an embodiment of the present specification. At step 1302, a first high-resolution scan image of an object is obtained. At step 1304 a second high-contrast scan image of the same object is obtained. In embodiments, the first high-resolution scan image is obtained by using an inspection system in which the irradiating X-ray beam is filtered by using a thin/minimal filter; and the second high-contrast image scan image is obtained by using an inspection system in which the irradiating X-ray beam is filtered by using a thick filter. In various embodiments, edges located in the first high-resolution image are used as a guide to enhance the edges located in the second high-contrast image. At step 1306 regions containing edges in the second image are determined by using the first image as a guide. At step 1308 an edge enhance routine is applied to the regions known to contain edges in the second image, while leaving other regions untouched, thereby preventing the edge enhance algorithms from enhancing noise in regions of the image where there are no edges. At step 1310, once located, the edges are used as a guide for edge preservation in the second image while applying a smoothing algorithm to mitigate the noise of the second high-contrast image. In an embodiment, potential threats located in the second high-contrast image may be used as guides to apply graphical bounding boxes or other indicators to the first high-resolution/high-SNR image in order to direct a human operator to analyze the threat regions.

The above examples are merely illustrative of the many applications of the system and method of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

I claim:

1. An X-ray inspection system for scanning an object, the system comprising:
   an X-ray source configured to generate an X-ray beam for irradiating the object, wherein the X-ray beam irradiating the object defines a field of view and wherein the X-ray source is coupled with at least a first beam filter having a first thickness and a second beam filter having a second thickness greater than the first thickness;
   a detector array adapted to receive radiation, originating from the X-ray beam, that is transmitted through, or scattered from, the object and to generate data representative of at least one image;
   a computing device configured to receive the data representative of at least one image and to generate the at least one image for display based on the data representative of at least one image;
   a user interface configured to receive a first user input indicative of a desired level of contrast in the at least one image and a second user input indicative of a desired scan speed of the object, wherein the system determines a highest possible level of contrast based on the desired scan speed; and
   a controller configured to adjust a position of at least one of the first beam filter or the second beam filter based on the user input indicative of the desired level of contrast in the at least one image, if the desired level of contrast does not exceed the highest possible level of contrast.

2. The X-ray inspection system of claim 1, wherein the desired level of contrast comprises at least one of a first contrast level, a second contrast level, a third contrast level, or a fourth contrast level and wherein the first contrast level is less than the second contrast level, the second contrast level is less than the third contrast level, and the third contrast level is less than the fourth contrast level.

3. The X-ray inspection system of claim 2, wherein, upon the user interface receiving the user input of the first contrast level, the controller is configured to cause the first beam filter and the second beam filter to not be in the field of view of the X-ray source.

4. The X-ray inspection system of claim 2, wherein, upon the user interface receiving the user input of the second contrast level, the controller is configured to cause the first beam filter to be in the field of view of the X-ray source and the second beam filter to not be in the field of view of the X-ray source.

5. The X-ray inspection system of claim 2, wherein, upon the user interface receiving the user input of the third contrast level, the controller is configured to cause the first beam filter to not be in the field of view of the X-ray source and the second beam filter to be in the field of view of the X-ray source.

6. The X-ray inspection system of claim 2, wherein, upon the user interface receiving the user input of the fourth contrast level, the controller is configured to cause the first beam filter to be in the field of view of the X-ray source and the second beam filter to be in the field of view of the X-ray source.

7. The X-ray inspection system of claim 1, wherein the first beam filter and the second beam filter comprise a metallic material having a high atomic number.

8. The X-ray inspection system of claim 1, wherein the first beam filter and the second beam filter comprise at least one of bronze, tin, tungsten, copper or a copper matrix embedded with tungsten particles.

9. The X-ray inspection system of claim 1, wherein the first beam filter and the second beam filter comprise a first layer made of tungsten or lead and a second layer made of steel or copper configured to absorb fluorescence emitted by the first layer.

10. The X-ray inspection system of claim 1, further comprising a shielding coupled with the first beam filter and the second beam filter configured to reduce radiation leakage.

11. The X-ray inspection system of claim 1, further comprising a pencil beam forming aperture placed in front of the X-ray source wherein the first beam filter is positioned between the X-ray source and the pencil beam forming aperture, and wherein image contrast increases by: increasing the distance between the pencil beam forming aperture and the first beam filter, and decreasing the distance between the first beam filter and the X-ray source.

12. The X-ray inspection system of claim 1, further comprising a third beam filter.

13. The X-ray inspection system of claim 12, wherein the first beam filter, second beam filter, and third beam filter comprise a 0.5 mm thick copper material, a 1.0 mm thick copper material, and a 2.0 mm thick copper material, respectively.

14. The X-ray inspection system of claim 1, wherein the computing device is further configured to modify one or more nonlinear transfer functions adapted to process the data representative of at least one image based on the desired level of contrast.

15. The X-ray inspection system of claim 14, wherein the nonlinear transfer functions comprise at least one of a gamma function or a S-curve function.

16. The X-ray inspection system of claim 2, wherein the computing device is further configured to implement at least one of a first set of programmatic instructions or a second set of programmatic instructions based on the desired level of contrast.

17. The X-ray inspection system of claim 16, wherein the computing device is further configured to implement the first set of programmatic instructions based on at least one of the first contrast level or second contrast level and wherein the first set of programmatic instructions comprise one or more contrast enhancement functions.

18. The X-ray inspection system of claim 16, wherein the computing device is further configured to implement the second set of programmatic instructions based on at least one of the third contrast level or fourth contrast level and wherein the second set of programmatic instructions comprise one or more edge enhancement functions.

* * * * *